(12) United States Patent
Haikin et al.

(10) Patent No.: US 6,919,975 B1
(45) Date of Patent: Jul. 19, 2005

(54) CREATION OF REVERSE LOOK-UP TABLE

(75) Inventors: John S. Haikin, Fremont, CA (US); Todd D. Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/360,449

(22) Filed: Jul. 26, 1999

(51) Int. Cl.$^7$ ............................ G03F 3/08; G06K 15/00; G06F 15/00
(52) U.S. Cl. ......................... 358/518; 358/1.9; 358/1.15
(58) Field of Search ........................ 358/527, 1.9–1.15, 358/518

(56) References Cited

U.S. PATENT DOCUMENTS

| | | | | |
|---|---|---|---|---|
| 5,296,923 A | * | 3/1994 | Hung ........................... | 358/527 |
| 5,299,291 A | | 3/1994 | Ruetz ........................... | 395/109 |
| 5,323,249 A | * | 6/1994 | Liang ........................... | 358/518 |
| 5,412,491 A | * | 5/1995 | Bachar ......................... | 358/500 |
| 5,463,480 A | | 10/1995 | MacDonald et al. ......... | 358/520 |
| 5,608,549 A | * | 3/1997 | Usami ......................... | 358/530 |
| 5,625,378 A | | 4/1997 | Wan et al. .................... | 345/150 |
| 5,704,026 A | | 12/1997 | Wan ............................ | 395/131 |
| 5,719,965 A | * | 2/1998 | Degi et al. ................... | 382/254 |
| 5,721,572 A | | 2/1998 | Wan et al. .................... | 345/431 |
| 5,739,928 A | | 4/1998 | Scott ........................... | 358/520 |
| 5,786,908 A | | 7/1998 | Liang ........................... | 358/518 |

OTHER PUBLICATIONS

"Example 1", http://uranus.ee.auth.grlessons/1/examples/example1.html, 2 pp. visited Jun. 18, 1999.
"Example 2", http://uranus.ee.auth.gr/lessons/1/examples/example2.html, 2 pp., visited Jul. 8, 1999.
P. Hung, "Colorimetric Calibration for Scanners and Media", Camera and Input Scanner Systems, SPIE, vol. 1448, pp. 164–174, 1991.
P. Hung, "Color Rendition Using Three–Dimensional Interpolation", Imaging Applications in the Work World, SPIE, vol. 900, pp. 111–115, 1988.
"Newton–Raphson Method using derivatives", http://uranus.ee.auth.gr/lessons/1.5/html, 2 pp., visited Jun. 18, 1999.

* cited by examiner

*Primary Examiner*—Edward Coles
*Assistant Examiner*—Saeid Ebrahim
(74) *Attorney, Agent, or Firm*—Fitzpatrick, Cella, Harper & Scinto

(57) ABSTRACT

Creation of a reverse look-up table from a forward look-up table for a color device. Indexes to the forward look-up table span all possible color stimulus values for the color device in a device dependent color space. Outputs from the forward look-up table span a color gamut of corresponding color response values for the color device in a device independent appearance color space. The reverse look-up table maps a color response value in the device independent appearance color space to a color stimulus value in the device dependent color space. Indexes to the reverse look-up table span beyond the color gamut of color response values for the color device, and outputs from the reverse look-up table span beyond all possible color stimulus values for the color device. According to the invention, a first portion of the reverse look-up table, in which indexes fall within the color gamut, is populated by search and interpolation in the forward look-up table for color stimulus values corresponding to color response values of the indexes to the first portion of the reverse look-up table. A second portion of the reverse look-up table, in which indexes fall outside of the color gamut, is populated by extrapolation from extrapolation color stimulus values. The extrapolation color stimulus values are found by search and interpolation in the forward look-up table for color stimulus values corresponding to color response values near a boundary of the color gamut.

46 Claims, 17 Drawing Sheets

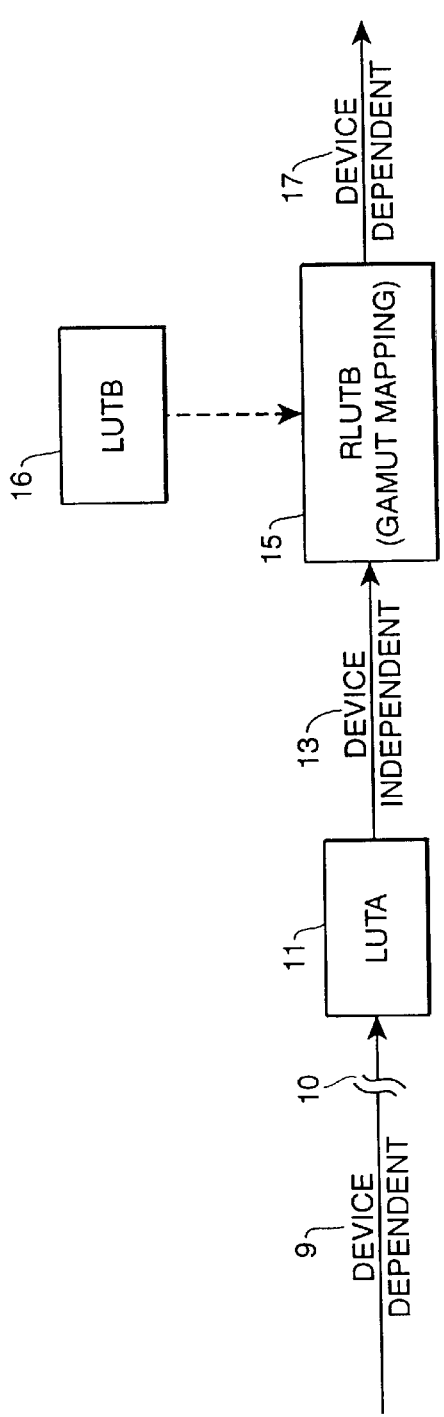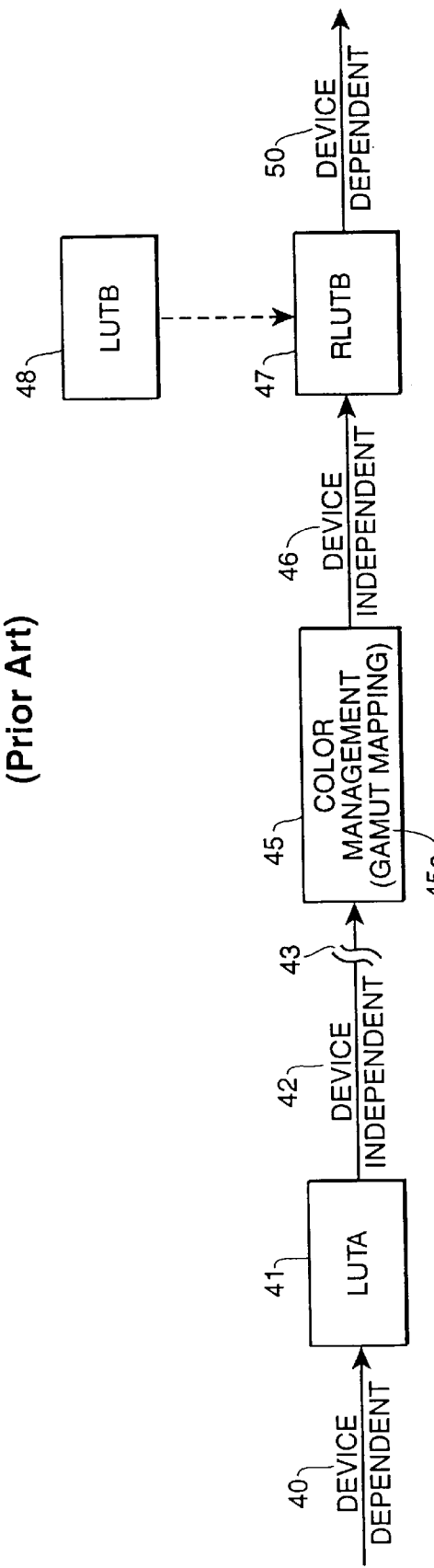

CREATION OF REVERSE LOOK-UP TABLE

BACKGROUND OF THE INVENTION

1. Field of the Invention

The invention is directed to creation of a reverse look-up table from a forward look-up table for mapping between color spaces, in which the reverse look-up table includes input indexes that fall outside of a color gamut of a color device. In particular, the invention concerns creation of such a table wherein output color values for the input indexes that fall outside of the color gamut are extrapolated from color values that are interpolated from the forward look-up table near the gamut boundary.

2. Description of the Related Art

One goal of modern color management is generation of uniform output images using different color image output devices. In particular, it is desired that a color image generated for output using a first image output device would appear similar if output using a second different image output device.

For example, as shown in FIG. 1, computer system 1 could be used to generate a color image for output using color laser printer 2. Then, the image could be sent to computer system 4 for output using ink-jet printer 5, for example over network connection 7. It is preferable that the images output by color laser printer 2 and ink-jet printer 5 both appear similar.

One conventional technique for attempting to ensure similar output images from different image output devices is illustrated in FIG. 2. In that figure, device dependent image 9 is defined in a device dependent color space corresponding to a first color device. Examples of the device dependent color space include CMY (cyan, magenta and yellow), CMYK (cyan, magenta, yellow and black) and RGB (red, green and blue) color spaces. Examples of the first color device include color laser printer 2 or a color monitor for computer system 1 shown in FIG. 1.

The device dependent image is transferred across connection 10 for output by a second color device. For example, device independent image 9 could be transferred across network connection 7 for output by ink-jet printer 5 or a color monitor for computer system 4 shown in FIG. 1.

In order to transform device dependent image 9 for output by the second color device, the device dependent image is first input to look-up table A (LUTA) 11. LUTA 11 transforms device dependent image 9 into device independent image 13 in a device independent appearance color space. The image is transformed in accordance with color characteristics of the first color device for which LUTA 11 is defined. Examples of device independent appearance color spaces are Lab, LCH and JCh color spaces. (The JCh color space preferably is defined in accordance with the CIECAM 97S appearance model).

Then, device independent image 13 is transformed by reverse look-up table B (RLUTB) 15 into device dependent image 17 in a device dependent color space. As indicated by the dashed arrow in FIG. 2, RLUTB is derived from look-up table B (LUTB) 16, which embodies the color characteristics of the second color device.

FIG. 3 illustrates LUTA 11 and RLUTB 15 in more detail. For the sake of simplicity, color values are represented in one dimension in FIG. 3.

LUTA 11 has input indexes for device dependent color stimulus values 21 and outputs for device independent color response values 22. The color stimulus values span all possible color stimulus values (here 0 to 9), and the color response values span all corresponding color response values in color gamut A 23 for the first color device.

Likewise, RLUTB 15 has input indexes for device independent color response values 25 and outputs for device dependent color stimulus values 26. The indexes for RLUTB 15 include color response values outside of color gamut B 27 for the second color device. RLUTB 15 therefore can be used with images whose colors extend beyond the colors that can be output by the second device. In order to accommodate those colors, for example a color response value of 1.6 at a lower end of color gamut A 23, RLUTB 15 incorporates gamut mapping 31 for out-of-gamut color response values.

The foregoing arrangement suffers from at least three deficiencies. First, gamut mapping 31 distorts the ends of RLUTB 15, preventing a mathematically accurate mapping from device independent color response values 25 to device dependent color stimulus values 26.

Second, in order to change the gamut mapping, it is necessary to rederive RLUTB 15 from LUTB 16. Rederiving RLUTB 15 can be computationally expensive.

Third, all possible input color response values for all possible color devices must be accounted for in the gamut mapping. In practice, however, many devices are incapable of creating many of these theoretically possible color response avalues. As a result, conventional gamut mapping which is incorporated into the reverse look-up table tends to overcompress the color gamut.

The foregoing deficiencies also arise in other contexts wherein a reverse look-up table is derived from a forward look-up table. For example, when an image generated for output using a monitor is instead output using a printer, a reverse look-up table for the printer can be used in the color mapping for the image. If the reverse look-up table is derived from a forward look-up table, then the deficiencies described above may be encountered.

SUMMARY OF THE INVENTION

The foregoing deficiencies are addressed according to the invention by removing the gamut mapping from the reverse look-up table. Thus, as shown in FIG. 4, device dependent image 40 defined in a device dependent color space is input to look-up table A (LUTA) 41. LUTA 41 transforms device dependent image 40 into device independent image 42 in a device independent appearance color space in accordance with color characteristics of a first color device for which LUTA 41 is defined. Device independent image 42 is transferred for output by a second color device across connection 43. Then, device independent image 42 undergoes gamut mapping 45a by color management module 45. The gamut mapped image, shown as device independent image 46, is still defined in the device independent appearance color space. After gamut mapping, device independent image 46 is transformed by reverse look-up table B (RLUTB) 47 into a device dependent image 50 in a device dependent color space. As indicated by the dashed arrow, RLUTB is derived from look-up table B (LUTB) 48, which embodies the color characteristics of the second color device.

Because RLUTB 47 does not include gamut mapping, the reverse look-up table does not have to be recalculated in order to adjust the gamut mapping. In addition, RLUTB 47 can be generated so as to produce a mathematically accurate mapping between the device independent appearance color space and the device dependent color space. This arrangement is illustrated in FIG. 5.

FIG. 5 illustrates LUTA 41, gamut mapping 45a and RLUTB 47 in more detail. Again for the sake of simplicity, color values are represented in one dimension in FIG. 5. LUTA 41 has input indexes for device dependent color stimulus values 53 and outputs for device independent color response values 54. The color stimulus values span all possible color stimulus values (here 0 to 9), and the color response values span all corresponding color response values in color gamut A 55 for the first color device.

Gamut mapping 45a transforms device independent color response values 57 to device independent color response values 58. Preferably, the gamut mapping is derived specifically for the color devices corresponding to LUTA 41 and RLUTB 47. The domain of input color response values for gamut mapping 45a spans color gamut A 55 for the first color device, and the range of output color response values spans color gamut B 59 for the second color device. Thus, gamut mapping 45a maps all possible color response values for the first color device to all possible color response values for the second color device. As a result, any image input to gamut mapping 45a will result in a color response value that can be generated by the second color device.

RLUTB 47 has input indexes for device independent color response values 61 and outputs for device dependent color stimulus values 62. RLUTB 47 does not need to incorporate gamut mapping. Thus, a mathematically accurate mapping between the device independent color response values and the device dependent color stimulus values can be utilized. However, a problem arises when generating this mathematically accurate mapping.

In more detail, the indexes to RLUTB 47 in FIG. 5 do not include device dependent color response values for boundary values of color gamut B 59. This is because RLUTB 47, like all of the look-up tables discussed herein, preferably is uniformly sampled. In general, the gamut boundaries fall between sampled points. Thus, the indexes do not include color response values 1.72 and 7.5 (which are shown in parenthesis for reference purposes, but which are not included in RLUTB 47).

Typically, interpolation is used in order to find color stimulus values corresponding to color response values for which indexes are not included in a reverse look-up table. Interpolation cannot be performed, however, unless indexes and corresponding output values are provided on both sides of the missing color response values. Conventionally, color response values of indexes beyond the gamut boundary cannot be sampled. Thus, any color response values between a boundary value and a corresponding nearest sampled color response value are not represented in a conventional reverse look-up table.

The reverse look-up table according to the invention includes out-of-gamut indexes, along with output color stimulus values corresponding to the indexes. These indexes allow for interpolation of color response values between a boundary value and a corresponding nearest sampled color response value. For example, as shown in FIG. 5, an index is included in RLUTB 47 for a color response value of 1.0. This index allows interpolation to be performed at the boundary color response value of 1.72. Likewise, in order to allow for interpolation at the boundary color response value of 7.5, an index is included for a color response value of 8.0. The corresponding color stimulus values are indicated by question marks 64 and 65 in FIG. 5.

In FIG. 5, these indexes lie outside of color gamut B 59 for the second color device, and therefore lie outside of the color response values provided in LUTB 48. In other words, these indexes correspond to "impossible" color response values which cannot be output by the second color device. Therefore, it is not possible to search and interpolate the corresponding forward LUTB 48 for color stimulus values corresponding to the color response values for these indexes.

The preceding discussion can be extended to look-up tables of higher dimensions by those skilled in the art. In general, finding a point by interpolation requires all neighbors in the look-up table to be complete. For a one dimensional table, this requires two neighbors. Likewise, a two dimensional table requires four neighbors, and an N dimensional table requires $2^N$ neighbors.

The present invention addresses the foregoing problem by extrapolating color stimulus values corresponding to the color response values needed for interpolation to the gamut boundary. The color stimulus values are extrapolated from color stimulus values found within and near the boundary of color gamut B 59. Because these color stimulus values are within the color gamut, the color stimulus values can be found by searching and interpolating in LUTB 48.

By virtue of the foregoing technique, color stimulus values can be interpolated in the reverse look-up table for color response values near the gamut boundary, and a mathematically accurate mapping from device independent color response values to device dependent color stimulus values can be achieved.

Accordingly, in one aspect, the present invention concerns creation of a reverse look-up table from a forward look-up table for a color device. The forward look-up table maps a color stimulus value in a device dependent color space to a color response value in a device independent appearance color space. Indexes to the forward look-up table span all possible color stimulus values for the color device, and outputs from the forward look-up table span a color gamut of corresponding color response values for the color device. The reverse look-up table maps a color response value in the device independent appearance color space to a color stimulus value in the device dependent color space. Indexes to the reverse look-up table span beyond the color gamut of color response values for the color device, and outputs from the reverse look-up table spanning beyond all possible color stimulus values for the color device.

According to the invention, a first portion of the reverse look-up table is populated, wherein indexes to the first portion comprise color response values that fall within the color gamut of the color device. The first portion is populated by search and interpolation in the forward look-up table for color stimulus values corresponding to color response values of the indexes to the first portion of the reverse look-up table. A second portion of the reverse look-up table also is populated, wherein indexes to the second portion comprise color response values that fall outside of the color gamut of the color device. The second portion is populated by extrapolation from extrapolation color stimulus values. The extrapolation color stimulus values are found by search and interpolation in the forward look-up table for color stimulus values corresponding to color response values near a boundary of the color gamut.

The foregoing operation creates a reverse look-up table with indexes and corresponding output color stimulus values which allow accurate interpolation near a gamut boundary for the color device.

In the preferred embodiment, search and interpolation in the forward look-up table is performed by a conventional technique such as the Newton-Raphson method. Also in the preferred embodiment, it is determined whether an index to the reverse look-up table is in the first portion or the second portion by attempting to search and to interpolate in the forward look-up table for a color stimulus value corresponding to the color response value of the index. If the search and interpolation succeeds, it is determined that the index is to the first portion of the reverse look-up table. If the search and interpolation does not succeed, it is determined that the index is to the second portion of the reverse look-up table.

Several techniques are contemplated for the search and interpolation to find the extrapolation stimulus values. According to one technique, the search and interpolation includes the steps of: (1) determining color response values of indexes to the first portion of the reverse look-up table adjacent to and in a line with the index to the second portion of the reverse look-up table, and (2) searching and interpolating in the forward look-up table for color stimulus values corresponding to the determined color response values.

According to another technique, the search and interpolation to find the extrapolation stimulus values comprises the steps of: (1) determining a color response value of an index to the first portion of the reverse look-up table adjacent to the index to the second portion of the reverse look-up table, and (2) attempting to search and to interpolate in the forward look-up table for color stimulus values corresponding to color response values along a search segment between the determined color response value and a color response value of the index to the second portion of the reverse look-up table until an attempt fails, with attempts starting at the determined color response value and progressing at predetermined increments toward the color response value of the index to the second portion of the reverse look-up table. Yet another technique utilizes a binary search.

Further techniques utilize extrapolation based on a determined slope of color stimulus values near the gamut boundary.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 2 and 3 illustrate a forward look-up table for a first color device used in conjunction with a reverse look-up table for a second color device, wherein the reverse look-up table incorporates gamut mapping according to conventional techniques.

FIGS. 4 and 5 illustrate a forward look-up table for a first color device used in conjunction with a reverse look-up table according to the invention for a second color device, wherein gamut mapping is performed outside of the look-up tables.

DETAILED DESCRIPTION OF THE PREFERRED EMBODIMENTS

Figure 6:
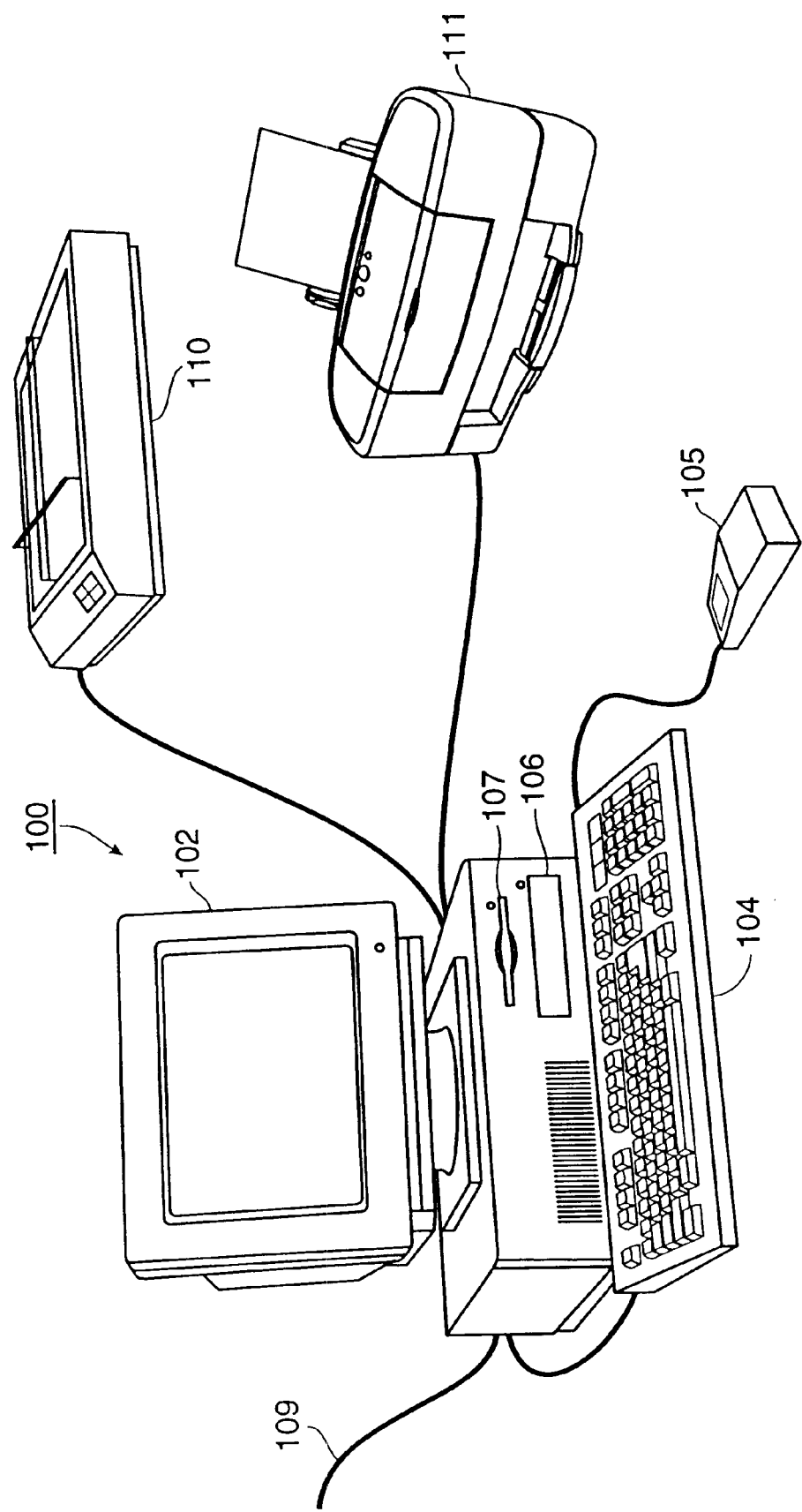
FIG. 6 is a representational view of a computer system which may be utilized according to the invention to create a reverse look-up table.

FIG. 6 is a representational view of a computer system which may be utilized according to the invention to create a reverse look-up table. Computer system 100 is preferably an IBM PC-compatible system executing Microsoft Windows98. Computer system 100 may be another type of system executing a windowing environment, such as a Macintosh or the like. Provided with computer system 100 are display 102, which is preferably a color monitor, keyboard 104 for entering user commands, and a pointing device such as mouse 105 for pointing to and for manipulating graphical user interfaces and other objects displayed on display 102.

Computer system 100 also includes a mass storage device such as fixed disk 106 for storing computer-executable process steps for creation of a reverse look-up table according to the invention. Fixed disk 106 also stores an operating system, a printer driver, an XY table driver, other device drivers, a forward look-up table, a reverse look-up table, and the like for use in conjunction with the invention. The storage provided by fixed disk 106 may also be provided by a CD-ROM accessed via a CD-ROM drive (both not shown).

Floppy disk interface 107 is used to access files stored on floppy disks for direct loading into a Random Access Memory (RAM) of computer system 100, or into fixed disk 106. Computer-executable process steps, files and data also can be sent or retrieved over a network via network connection 109.

Although computer system 100 is depicted as a programmable general-purpose computer, the present invention can be implemented using a dedicated computer terminal or other type of data processing equipment.

Also provided with computer system 100 are color devices such as XY table 110 and printer 111. XY table 110 is used for making color measurements of a target documented so as to characterize a printer which printed the target document. Thus, XY table 110 can be used to characterize printer 111, which is provided for outputting color images from computer system 100.

In more detail, a forward look-up table which characterizes printer 111 can be created by printing a series of color patches on a target document, with the color patches printed from color stimulus values that span all possible color stimulus values for printer 111. Then, XY table 110 scans the target document so as to determine device independent color response values corresponding to the color stimulus values. A forward look-up table can be constructed from these color stimulus and color response values. A reverse look-up table can then be created from the forward look-up table using the techniques of the invention.

Alternatively, another color measuring device, such as a strip reader or a patch reader, can provide the color response values. In addition, the forward look-up table can be provided to computer system 100 via network connection 109, floppy disk interface 107, or from some other source.

Figure 7:
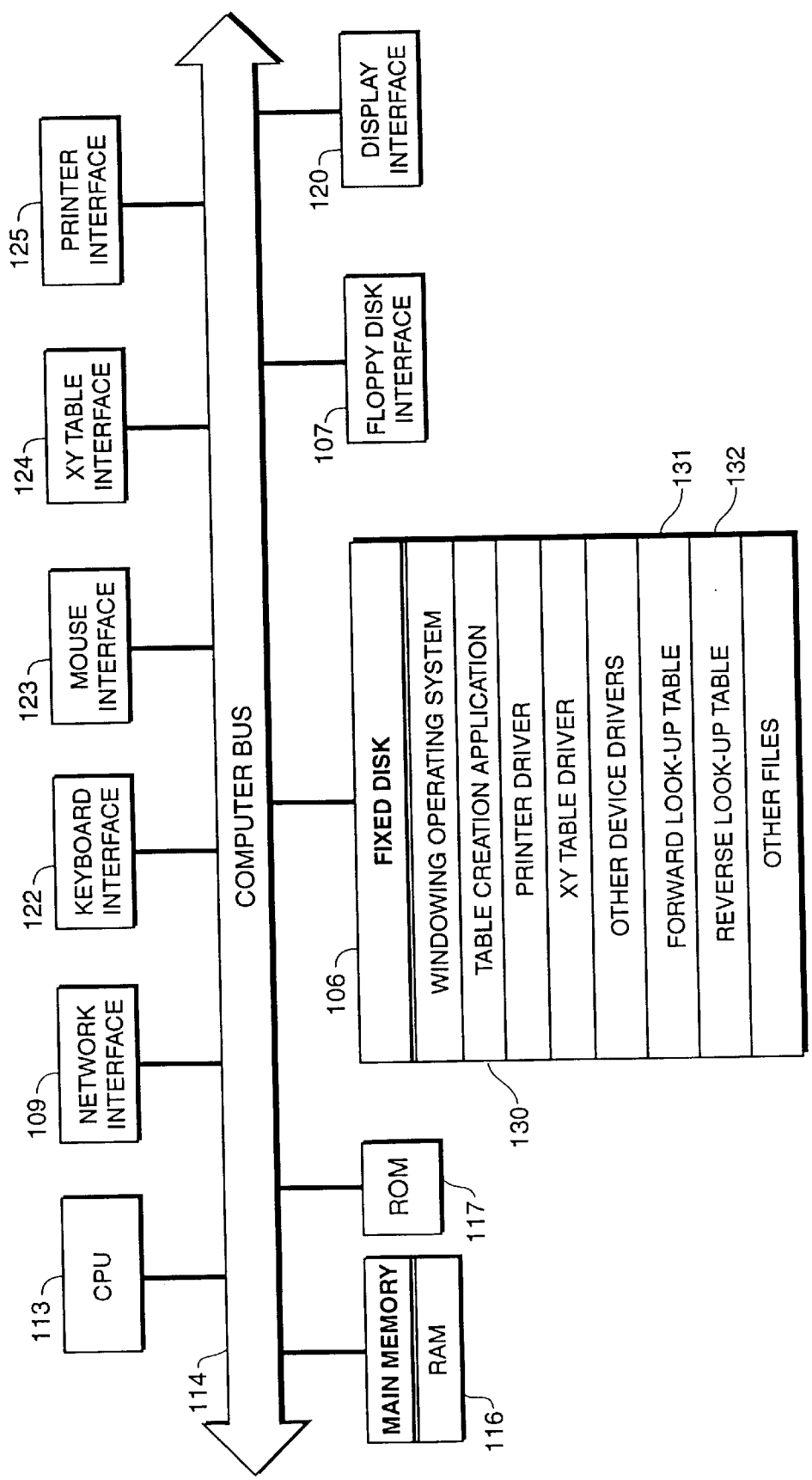
FIG. 7 is a detailed block diagram showing the internal architecture of the computer system shown in FIG. 6.

FIG. 7 is a detailed block diagram showing the internal architecture of computer system 100. As shown in FIG. 7, computer system 100 includes central processing unit (CPU) 113 which interfaces with computer bus 114. Also interfacing with computer bus 114 are fixed disk 106, network interface 109, main memory (RAM) 116, read only memory (ROM) 117, floppy disk interface 107, display interface 120 to monitor 102, keyboard interface 122 to keyboard 104, mouse interface 123 to mouse 105, XY table interface 124 to XY table 110, and printer interface 125 to printer 111.

Main memory 116 interfaces with computer bus 114 so as to provide RAM storage to CPU 113 during execution of an operating system, device drivers, and application programs such as a reverse look-up table application program according to the invention. More specifically, CPU 113 loads process steps into a region of main memory 116 from a computer readable medium such as fixed disk 106 or a floppy disk inserted into floppy disk interface 107, from another storage device, or from some other source such as a network. CPU 113 then executes the stored process steps from main memory 116 in order to execute the operating system, the device drivers, application programs and the like. Data such as forward and reverse look-up tables can be stored in main memory 116, where the data can be accessed by CPU 113 during execution of the process steps.

As also shown in FIG. 7, fixed disk 106 typically contains a windowing operating system, application programs such as reverse look-up table creation application program 130 according to the invention, device drivers including monitor, printer and XY table drivers, forward look-up table 131, reverse look-up table 132, and other files.

In the embodiment shown in FIG. 7, creation of a reverse look-up table according to the invention is performed by a reverse look-up table creation application program 130. However, the creation of the reverse look-up table need not be performed by such an application program. For example, the process steps for creating the table could be embedded into the XY table or printer driver, the operating system, some other application program, or the like.

Figure 8:
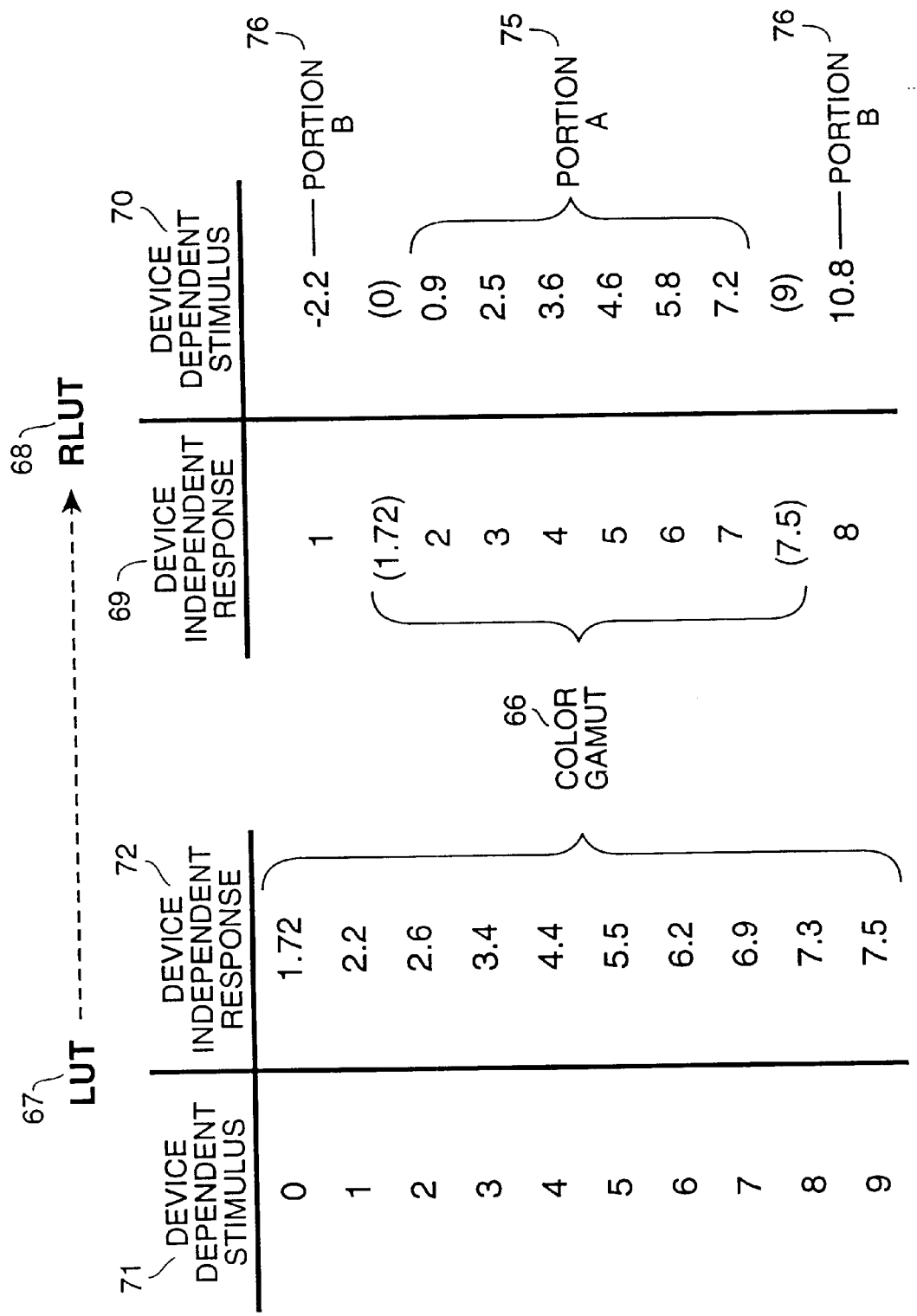
FIG. 8 illustrates creation of a reverse look-up table from a forward look-up table according to the invention.

FIG. 8 illustrates creation of a reverse look-up table from a forward look-up table according to the invention. The tables in FIG. 8 are shown in one dimension for the sake of simplicity. Application of the invention to multiple dimensions is discussed below with reference to FIG. 10.

Returning to FIG. 8, forward look-up table (LUT) 67 embodies color characteristics of a color device such as printer 111. LUT 67 maps device dependent color stimulus values 71 to device independent color response values 72. Indexes to LUT 67 span all possible color stimulus values for the color device (defined as 0 to 9 herein for illustrative purposes). Outputs from LUT 67 span color gamut 66 of corresponding color response values for the color device. RLUT 68 is a reverse look-up table derived from LUT 67.

Figure 1:
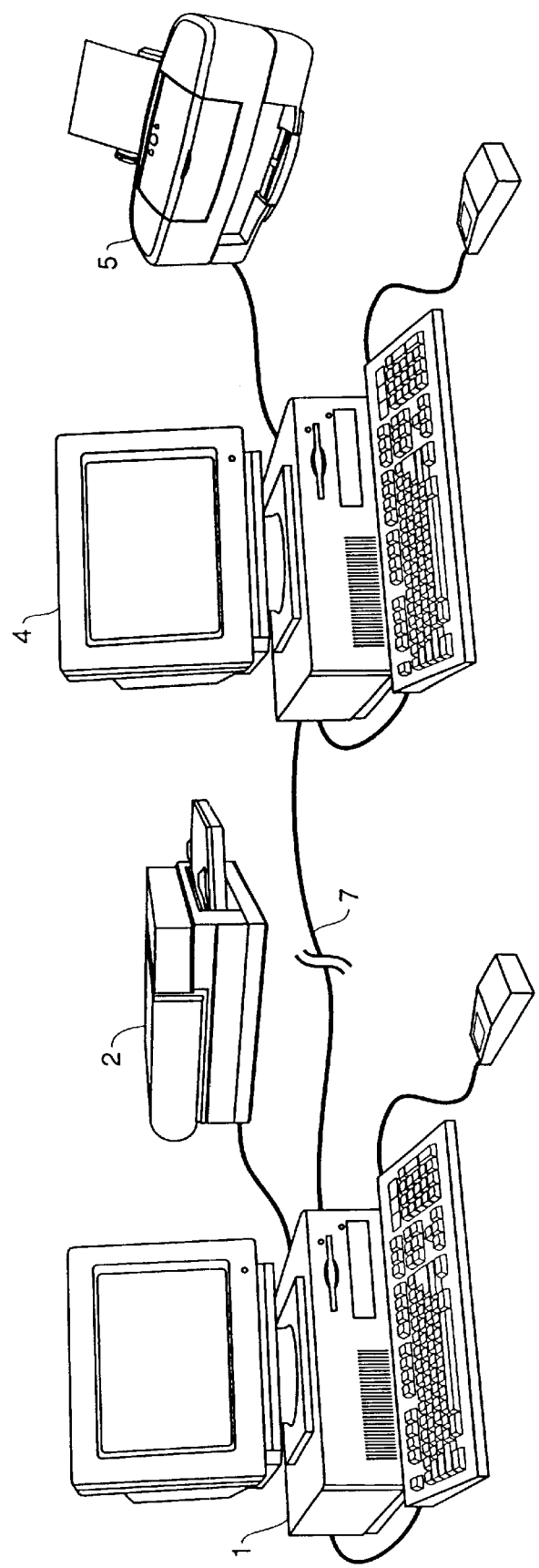
FIG. 1 is a representation view of an arrangement wherein an image generated for output using a first color image device can be output using a second color image device.
Figure 3:
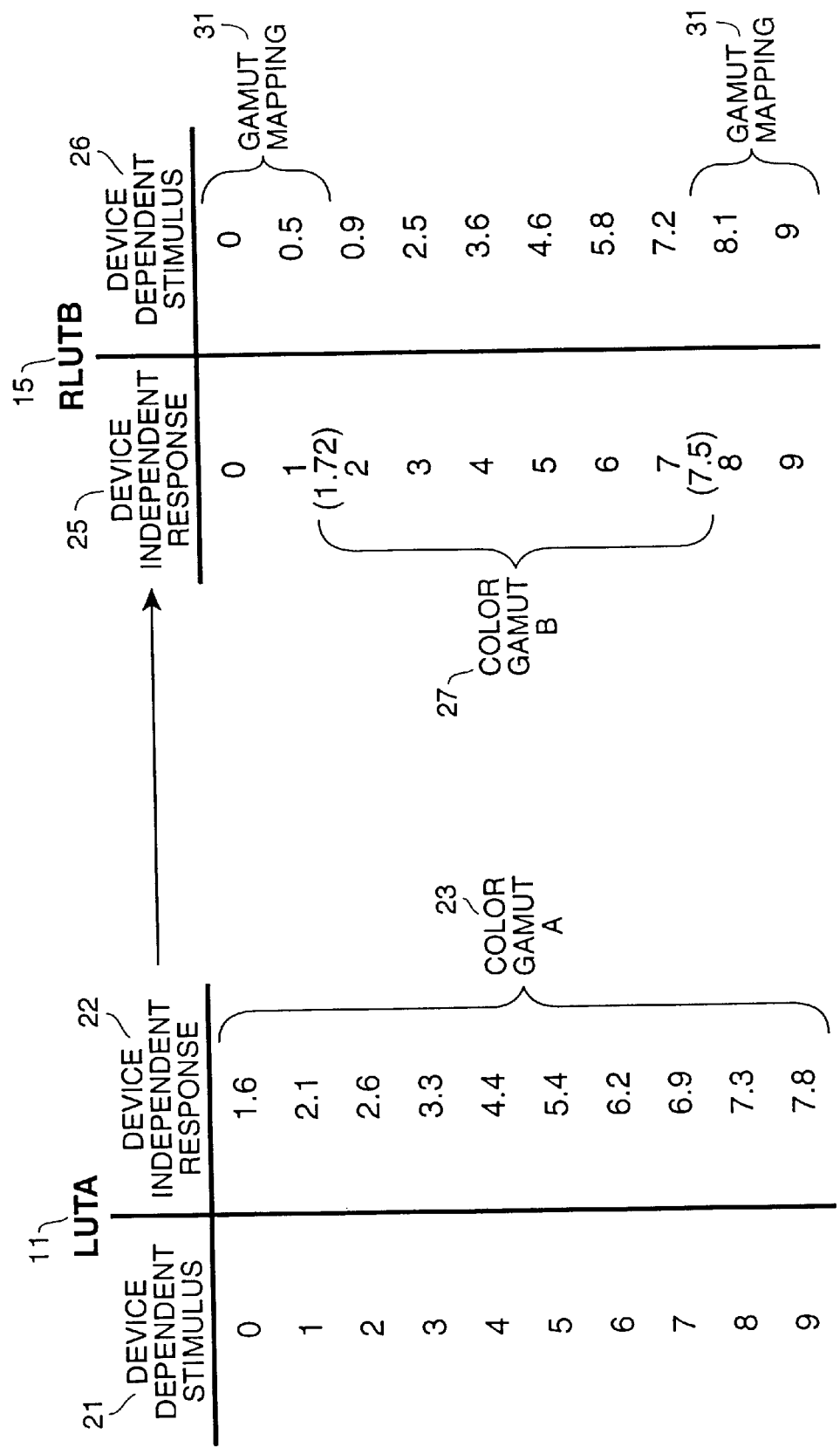
Figure 5:
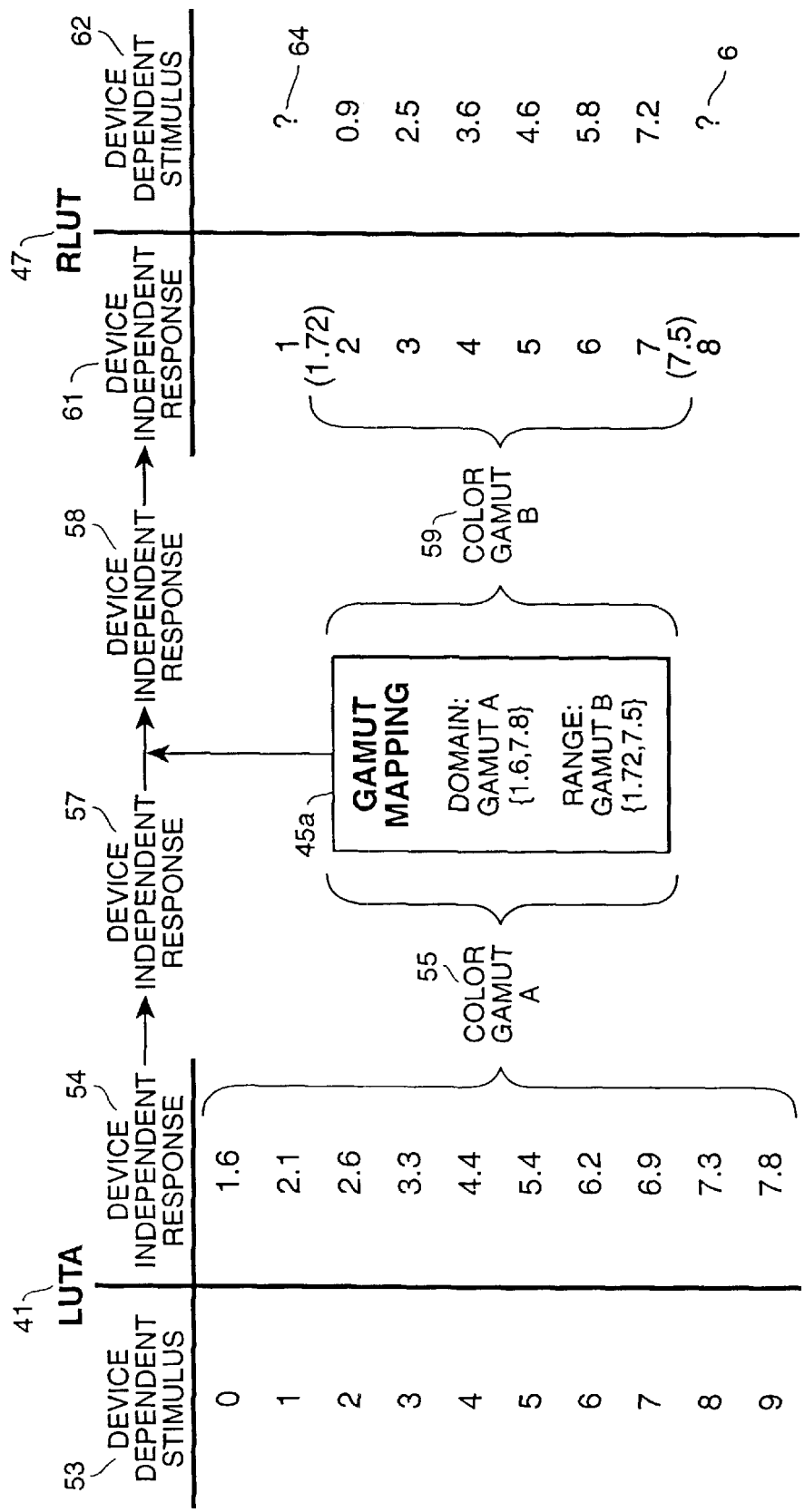

An example of LUT 67 is LUTB 48 discussed above with reference to FIG. 4. Likewise, an example of RLUT 68 is RLUTB 47 discussed above with reference to FIGS. 4 and 5.

In order to populate a portion of RLUT 68 in FIG. 8 with indexes that fall within color gamut 66 of the color device, corresponding device dependent color stimulus values can be found by searching and interpolating in LUT 67. In particular, the phrase "search and interpolate" refers to a process of searching and interpolating within LUT 67 for a device dependent color stimulus value which produces a given device independent color response value.

For example, a search for a color stimulus value which interpolates to color response value of 3.9 in LUT 67 results in a color stimulus value of 3.5. This example can be verified by noting that 3.5 falls midway between indexes with color stimulus values of 3.0 and 4.0, and that 3.9 falls midway between the corresponding color response values of 3.4 and 4.4.

The search and interpolation process is more complicated for multidimensional look-up tables. However, known techniques such as the Newton-Raphson method can be easily adapted by those skilled in the art so as to perform the requisite search and interpolation operations.

Returning to FIG. 8, the indexes to RLUT 68 do not include color response values for boundary values of color gamut 66. This is a result of the uniform sampling of color response values for the indexes to the reverse look-up table. In the example shown in FIG. 8, the uniform sampling is performed at integer increments. Thus, in FIG. 8, the indexes do not include color response values of 1.72 and 7.5 (which are shown in parenthesis for reference purposes, but which are not included in RLUT 68).

Typically, interpolation is used in order to find color stimulus values corresponding to color response values which do not coincide with an index to the reverse look-up table. Interpolation cannot be used, however, unless indexes are provided on both sides of the missing color response values. Thus, the reverse look-up table according to the invention includes such indexes.

As shown in FIG. 8, these indexes lie outside of color gamut 66 for the color device, and therefore lie outside of the color response values provided in LUT 67. Thus, it is not possible to search and to interpolate in LUT 67 for color stimulus values corresponding to the color response values for these indexes.

In view of the foregoing, the indexes to RLUT 68 can be divided into two portions based on whether or not it is possible to search and to interpolate in LUT 67 for color stimulus values corresponding to the color response values for the indexes. In FIG. 8, the indexes for which it is possible to search and to interpolate in LUT 67 are designated as portion A 75 of RLUT 68, and the indexes for which it is not possible to search and to interpolate in LUT 67 are designated as portion B 76 of RLUT 68.

According to the invention, portion B 76 of RLUT 68 should be populated with device dependent color stimulus values which allow accurate interpolation for color response values at the boundaries of color gamut 66. Such color stimulus values are included in RLUT 68 shown in FIG. 8, namely -2.2 and 10.8.

It should be noted that these color stimulus values are clearly outside of the defined permissible range of color stimulus values for FIG. 8, namely 0 to 9. In other words, the color stimulus values in portion B 76 of RLUT 68 correspond to "impossible" colors. However, these color stimulus values preferably are not directly used as outputs from RLUT 68, but rather only should be used to interpolate color stimulus values for color response values near the boundary of color gamut 66. Therefore, it is perfectly acceptable that the color stimulus values are for "impossible" colors.

Figure 9:
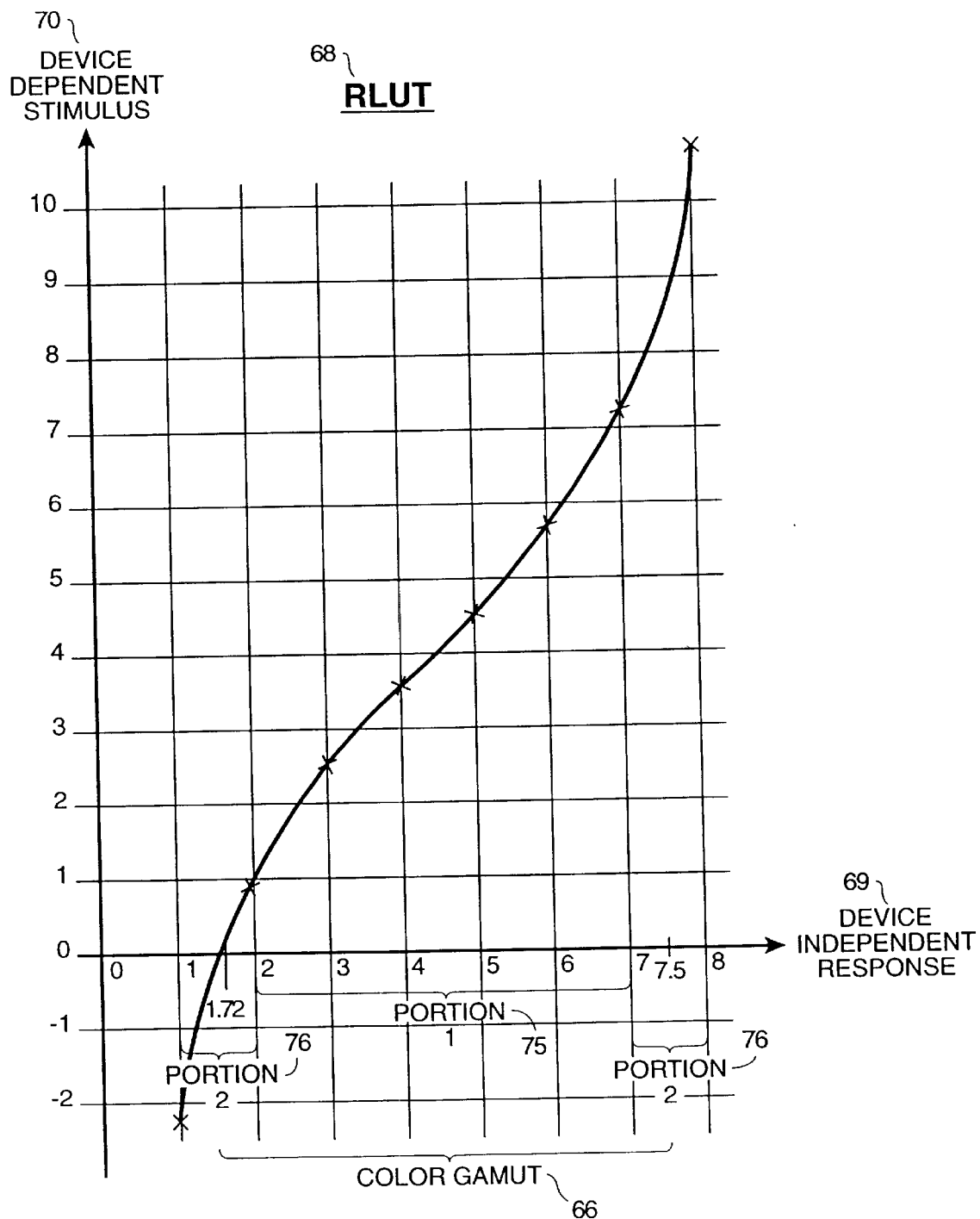
FIG. 9 is a graphical representation of the reverse look-up table in FIG. 8.

FIG. 9 is a graphical representation of RLUT 68 in FIG. 8. FIG. 9 shows indexes for various device independent color response values on the horizontal axis, output device dependent color stimulus values on the vertical axis, color gamut 66, and portion A 75 and portion B 76 of RLUT 68. Also shown in FIG. 9 is actual color mapping curve 79, extrapolated out to impossible color values in portion B 76 of RLUT 68.

Figure 10:
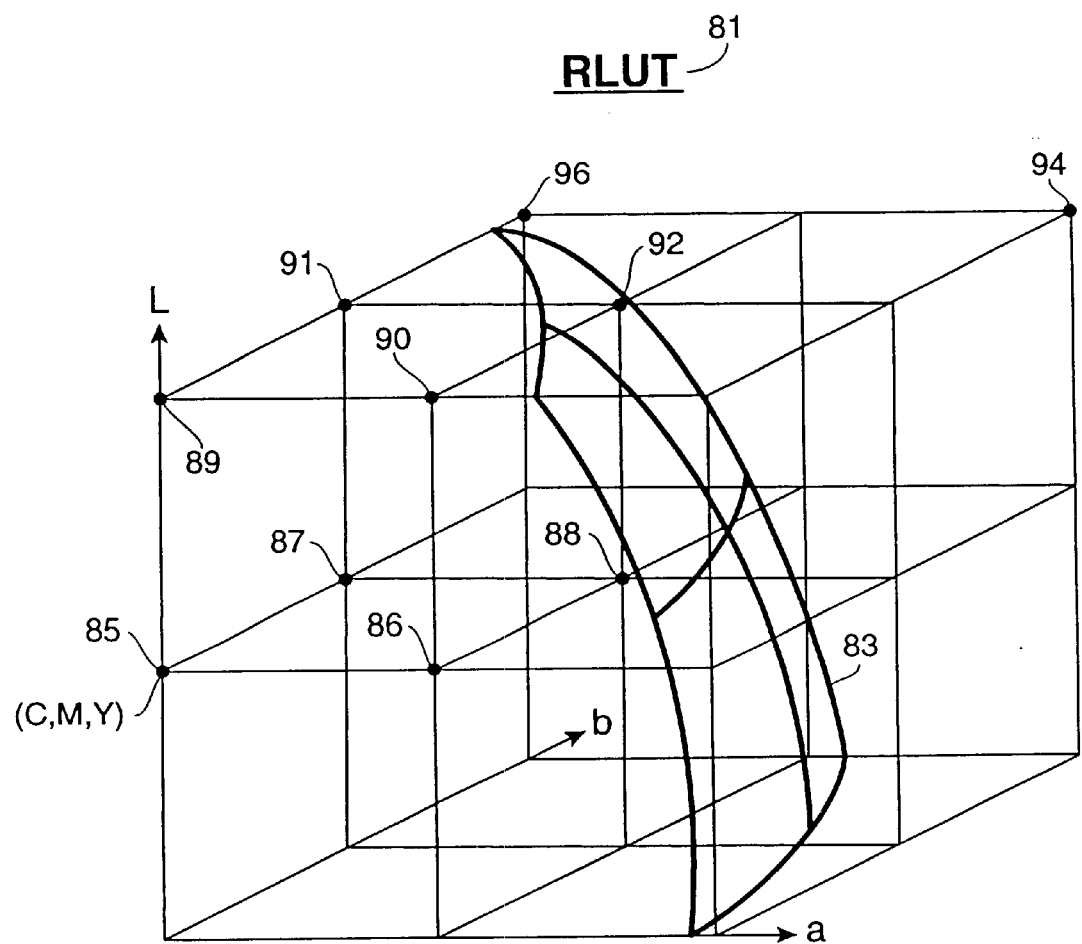
FIG. 10 is a representational view of a multidimensional reverse look-up table according to the invention.

FIG. 10 is a representational view of a multidimensional reverse look-up table according to the invention. This view more accurately represents the actual reverse look-up table utilized for transformations between color spaces. Each axis of RLUT 81 corresponds to one variable of a device independent appearance space, for example the Lab color space. Each vertex (index) therefore represents a color response value for the color device in the device independent color space. Ranges for the color response values in the device independent appearance color space typically are 0 to 255, with vertices (indexes) spaced at increments of 16. A color stimulus value, for example a CMY triplet, corresponds to each vertex, thereby associating a color stimulus value with each color response value index. Ranges for the color stimulus values also typically are 0 to 255.

In FIG. 10, surface 83 represents a gamut boundary for the color device in the device independent appearance color space. Thus, color response values at vertices 85 through 91 are within the color gamut for the color device, while the color response values at vertices 92, 94 and 96 are outside of the color gamut. Using the terminology developed with respect to FIG. 8, vertices 85 through 91 are in portion A of RLUT 81, while vertices 92 and 96 are in portion B of RLUT 81.

Vertex 94 is not adjacent to gamut boundary 83, and therefore is not likely to be used in interpolation for color response values near the gamut boundary. Accordingly, an index for vertex 94 need not be included in the reverse look-up table. However, if such an index is included in reverse look-up table 81, it is in portion B of the table.

Figure 11:
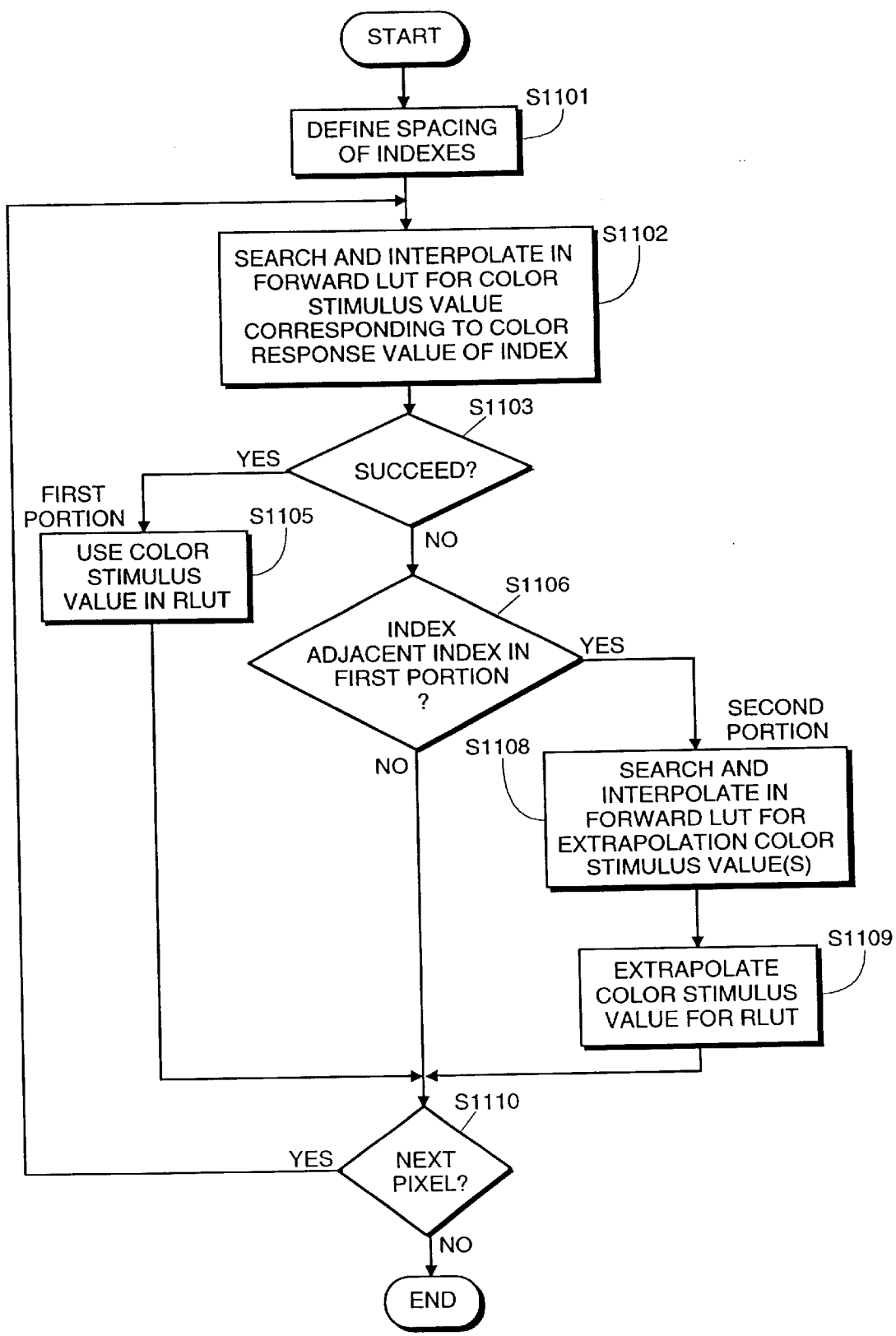
FIG. 11 is a flowchart for explaining creation of a reverse look-up table according to the invention.

FIG. 11 is a flowchart for explaining creation of a reverse look-up table according to the invention.

Briefly, according to the invention, a reverse look-up table is created from a forward look-up table for a color device. The forward look-up table maps a color stimulus value in a device dependent color space to a color response value in a device independent appearance color space. Indexes to the forward look-up table span all possible color stimulus values for the color device, and outputs from the forward look-up table span a color gamut of corresponding color response values for the color device. The reverse look-up table maps a color response value in the device independent appearance color space to a color stimulus value in the device dependent color space. Indexes to the reverse look-up table span beyond the color gamut of color response values for the color device, and outputs from the reverse look-up table spanning beyond all possible color stimulus values for the color device. A first portion of the reverse look-up table is populated, wherein indexes to the first portion comprise color response values that fall within the color gamut of the color device. The first portion is populated by search and interpolation in the forward look-up table for color stimulus values corresponding to color response values of the indexes to the first portion of the reverse look-up table. A second portion of the reverse look-up table also is populated, wherein indexes to the second portion comprise color response values that fall outside of the color gamut of the color device. The second portion is populated by extrapolation from extrapolation color stimulus values. The extrapolation color stimulus values are found by search and interpolation in the forward look-up table for color stimulus values corresponding to color response values near a boundary of the color gamut.

In order to simplify the following discussion, the steps shown in FIG. 11 generally will be discussed with reference to the one dimensional tables shown in FIG. 8. However, the techniques are particularly suited to multidimensional mapping (e.g., from Lab to CMY), as will be apparent to one skilled in the art. Special considerations for multidimensional tables will be discussed with reference to FIG. 10.

In step S1101 of FIG. 11, a spacing is defined for indexes for the reverse look-up table. This spacing is the uniform sampling rate for the reverse look-up table. In FIG. 8, the spacing is 1. In the discussion of FIG. 10, the spacing is 16.

In step S1102, an attempt is made to search and interpolate in the forward look-up table for a color stimulus value corresponding to the color response value of a first index. As discussed above, the search and interpolation preferably is performed using the Newton-Raphson method. However, any suitable mathematical technique for interpolating in a discrete space can be utilized.

If the search succeeds, then the index is in portion A of the reverse look-up table, and flow proceeds to step S1105. In step S1105, the color stimulus value which resulted from the search and interpolation is entered into the reverse look-up table. Then, flow proceeds to step S1110.

Returning to step S1103, if the search and interpolation in the forward look-up table does not succeed, then the index is in portion B of the reverse look-up table, and flow proceeds to step S1106. In step S1106, the index is checked to see if it is adjacent to an index in portion A of the reverse look-up table. For example, in FIG. 8, a hypothetical index with a color response value of 0 is not adjacent to an index in portion A of the table. An index with a color response value of 1.0 is adjacent to an index in portion A of the table, namely an index with a color response value of 2.0.

If the index is adjacent to an index in portion A, flow proceeds to steps S1108 and S1109 for extrapolation of a device dependent color stimulus value corresponding to the color response value for the index.

If the index is not adjacent to an index in portion A, then the color response value for the index is not adjacent to the boundary of the color gamut for the color device. Therefore, the corresponding color stimulus value is unlikely to be needed for interpolation and need not be entered into the reverse look-up table. (It is, of course, possible to include such a color stimulus value, if desired.) Accordingly, flow proceeds to step S1110 if the index is not adjacent to an index in portion A.

In the multidimensional case illustrated in FIG. 10, the index at vertex 92 is adjacent to the indexes at each of vertices 85 through 91, which are in portion A of the table. Thus, the index at vertex 92 is in portion B of the table. The index at vertex 94 is not adjacent to a vertex in portion A of the table. Therefore, the color response value of the vertex is not adjacent to gamut boundary 83, and a color stimulus value need not be entered in the reverse look-up table for the index at vertex 94.

Step S1108 finds color stimulus values for use in extrapolating an output color stimulus value for an index in portion B of the reverse look-up table. The color stimulus values used for the extrapolation are referred to as "extrapolation color stimulus values" hereinafter. Note that the extrapolation color stimulus values need not (and often do not) fall on the sample points (i.e., indexes) of the reverse look-up table. Step S1109 then interpolates a color stimulus value for the index in portion B of the table from these extrapolation color stimulus values.

Various techniques for determining the extrapolation color stimulus values are contemplated according to the invention. These techniques are explained below with reference to FIGS. 12 through 18.

Next, in step S1110, it is determined if more indexes need to be processed so as to complete the reverse look-up table. If more indexes need to be processed, flow returns to step S1102 for processing of the next index.

If the indexes of the reverse look-up table are traversed sequentially, it is likely that some indexes in portion B of the table will be processed before adjacent indexes in portion A. As a result, color stimulus values potentially needed for processing such indexes in portion B may not be available when each index is processed. Several techniques can be utilized to address this concern. These techniques include, but are not limited to, performing two passes through the reverse look-up table, processing indexes in portion A as needed (e.g., whenever an adjacent index in portion B is processed), or attempting to order the processing of indexes such that all indexes in portion A are processed before indexes in portion B. Other techniques can be utilized to ensure that needed color stimulus values are available.

Figure 12:
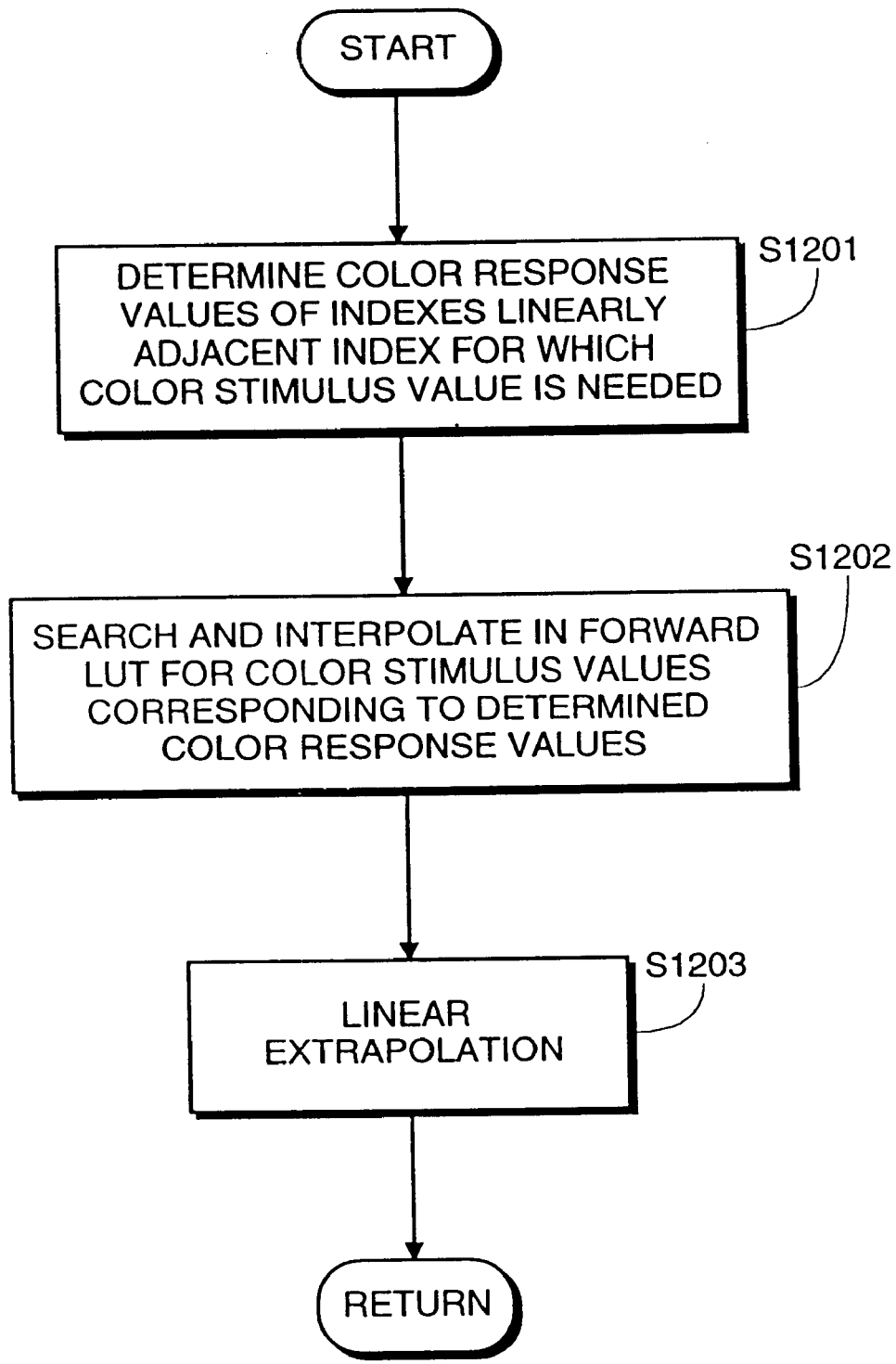
FIGS. 12, 14 and 16 are flowcharts for explaining various techniques according to the invention for search and interpolation in the forward look-up table for color stimulus values corresponding to color response values near a boundary of a color gamut.

FIG. 12 is a flowchart for explaining determination of extrapolation color stimulus values from indexes adjacent to and in a line with the index in portion B of the table for which a color stimulus value is to be extrapolated. In more detail, step S1201 determines color response values of indexes which are adjacent to and in a line with the index in portion B. For example, in FIG. 8, indexes with color response values of 2.0 and 3.0 are adjacent to the index at a color response value of 1.0 in portion B. Likewise, in the multidimensional case illustrated in FIG. 10, indexes at vertices 89 and 91 are adjacent to and in a line with the index at vertex 96.

In step S1202, color stimulus values for these determined indexes are found through search and interpolation in the forward look-up table. Thus, again with reference to FIG. 8, LUT 67 is searched and interpolated for color stimulus values corresponding to color response values of 2.0 and 3.0. The resulting color stimulus values, here color stimulus values of 0.9 and 2.5, are then used as the extrapolation color stimulus values.

It should be noted that in some cases, color response values for the adjacent indexes will already have been determined before the index in portion B is processed. In those cases, the color stimulus values corresponding to the indexes will already be entered into the reverse look-up table by step S1105. If the color stimulus values are already entered, it is not necessary to search and interpolate in the forward look-up table again; a rather, the already entered color stimulus values can be used.

In step S1203, linear extrapolation is performed using the extrapolation color stimulus values.

Figure 13:
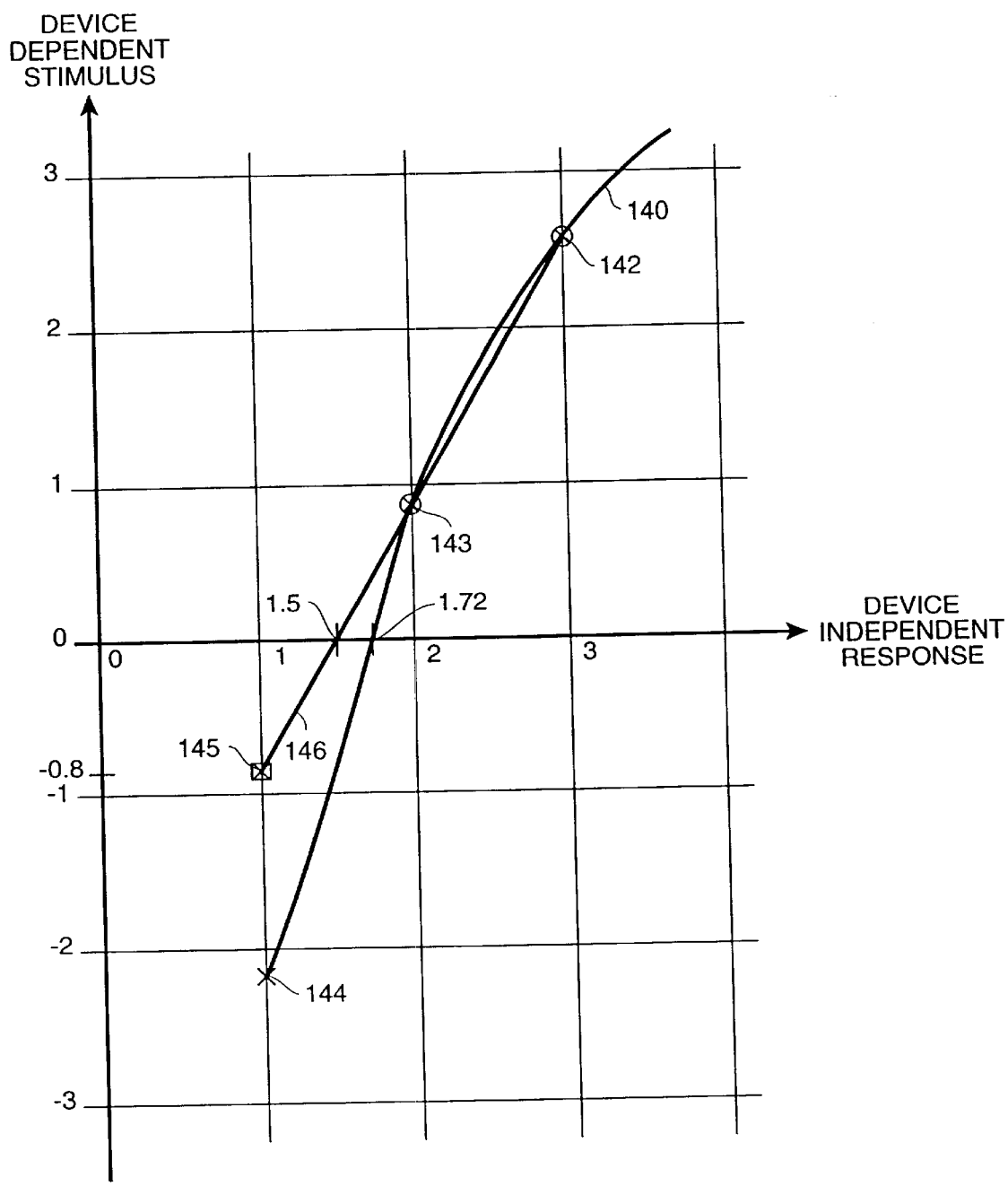
FIGS. 13, 15, 17 and 18 are graphs for explaining various techniques according to the invention for search and interpolation in the forward look-up table for color stimulus values corresponding to color response values near a boundary of a color gamut.

FIG. 13 illustrates the foregoing process for extrapolating a color stimulus value for an index at a color response value of 1.0. FIG. 13 includes mapping function 140 between device independent color response values and device dependent color stimulus values. Mapping function 140 corresponds to RLUT 68 in FIG. 8, extended beyond the gamut boundary at a color response value of 0 to illustrate a hypothetical best match to the actual behavior of the color device. This function maps to a color stimulus value of 0 at a color response value of 1.72, representing a gamut boundary at a color response value of 1.72.

In FIG. 13, extrapolation color stimulus values have been determined at points 142 and 143. Point 142 represents a color stimulus value of 2.5 at a color response value of 3.0, and point 143 represents a color stimulus value of 0.9 at a color response value of 2.0. Extrapolation from points 142 and 143 to a color response value of 1.0 (i.e., the color response value of an index in portion B of the reverse look-up table) results in point 145 on extrapolation line 146. This point has a color stimulus value of approximately –0.8. Thus, using the technique of FIG. 12, the extrapolated color stimulus value for the index at a color response value of 1.0 in portion B of RLUT 68 is –0.8.

This extrapolated color stimulus value is not equal to the corresponding color stimulus value shown in FIG. 8. In fact, when this color stimulus value is used to interpolate for a color response value near a gamut boundary, a color stimulus value along line 146 will result, which differs significantly from actual mapping function 140. Accordingly, it is preferable that a better extrapolation be utilized.

Figure 14:
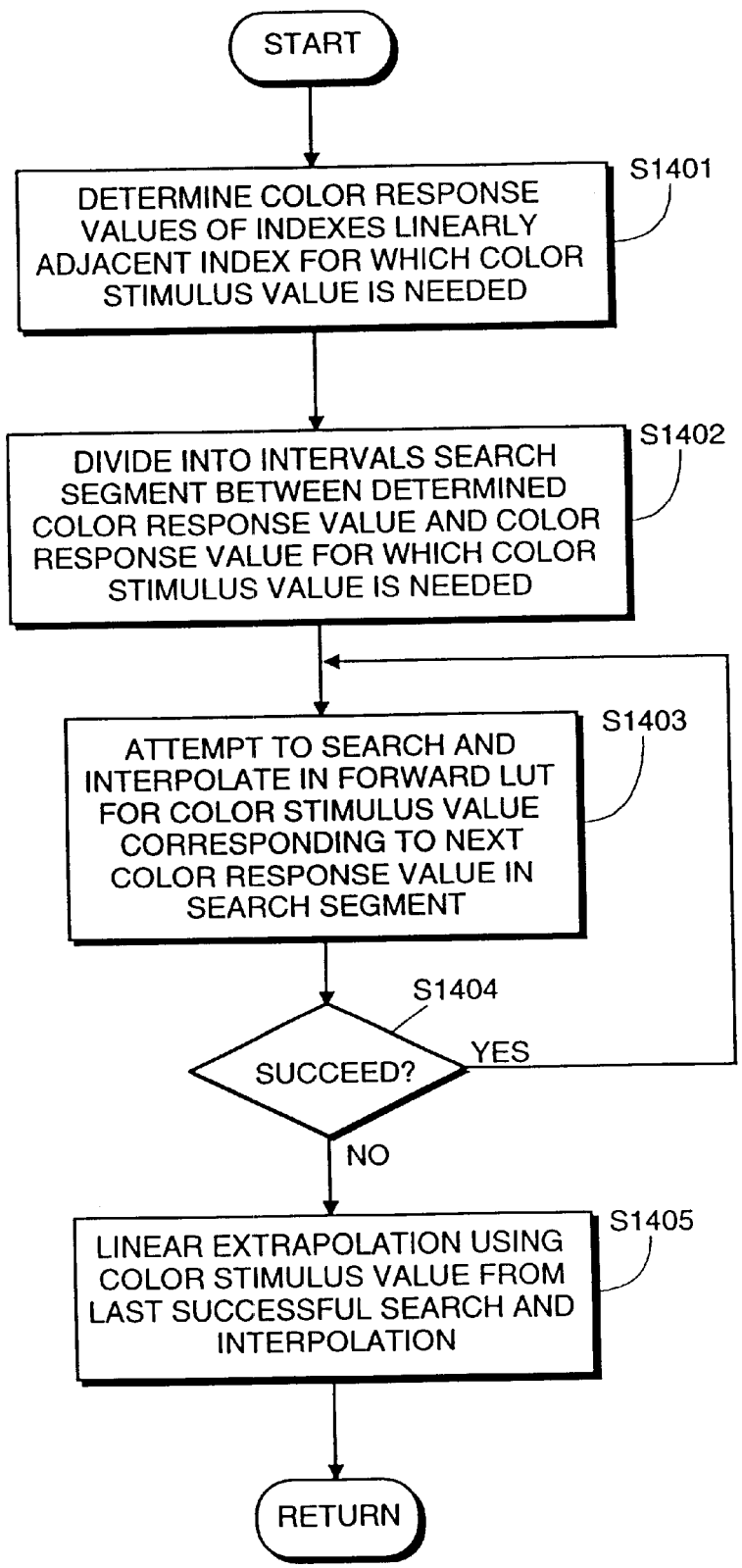

FIG. 14 is a flowchart for explaining determination of extrapolation color stimulus values using a step-wise search of color response values between the index in portion B and an adjacent index in portion A. In more detail, step S1401 determines a color response value of an index which is adjacent to the index in portion B. For example, in FIG. 8, the index with a color response value of 2.0 in portion A is adjacent to the index at a color response value of 1.0 in portion B. Likewise, in the multidimensional case illustrated in FIG. 10, indexes at vertices 85 through 91 in portion A are considered to be adjacent to the index at vertex 92 in portion B.

In step S1402, the interval between the index in portion A and the index in portion B is used as a search segment, with the search segment divided into a predetermined number (e.g., 10) of increments. Then, in step S1403, an attempt is made to find a color stimulus value corresponding to a color response value at a start of the search segment, which preferably is at the index in portion A. The attempt is made through search and interpolation in the forward look-up table.

For example, for a search segment between indexes with color response values of 1.0 and 2.0 in FIG. 8, a first search and interpolation of LUT 67 is performed for a color stimulus value corresponding to a color response value of 2.0.

In step S1404, it is determined if the search and interpolation succeeds. The search and interpolation will only succeed if the color response value for the search falls within the color gamut of the device characterized by the LUT. If the search and interpolation does succeed, flow returns to step S1403 for search and interpolation at the next increment along the search segment.

For example, if 10 increments are used, searches and interpolations are performed for LUT 67 and RLUT 68 in FIG. 8 for color response values of 2.0, 1.9, 1.8, and 1.7. The search and interpolation for 1.7 fails, because a color response value of 1.7 is less than the boundary at 1.72 for color gamut 66.

Once a search and interpolation fails, flow proceeds to step S1405, where the color stimulus value from the last successful search and interpolation is used for linear extrapolation. The other value for linear extrapolation preferably is the color stimulus value found for the adjacent index in portion A of the table. Alternatively, the second-to-last successfully searched interpolated color stimulus value may be used.

Figure 15:
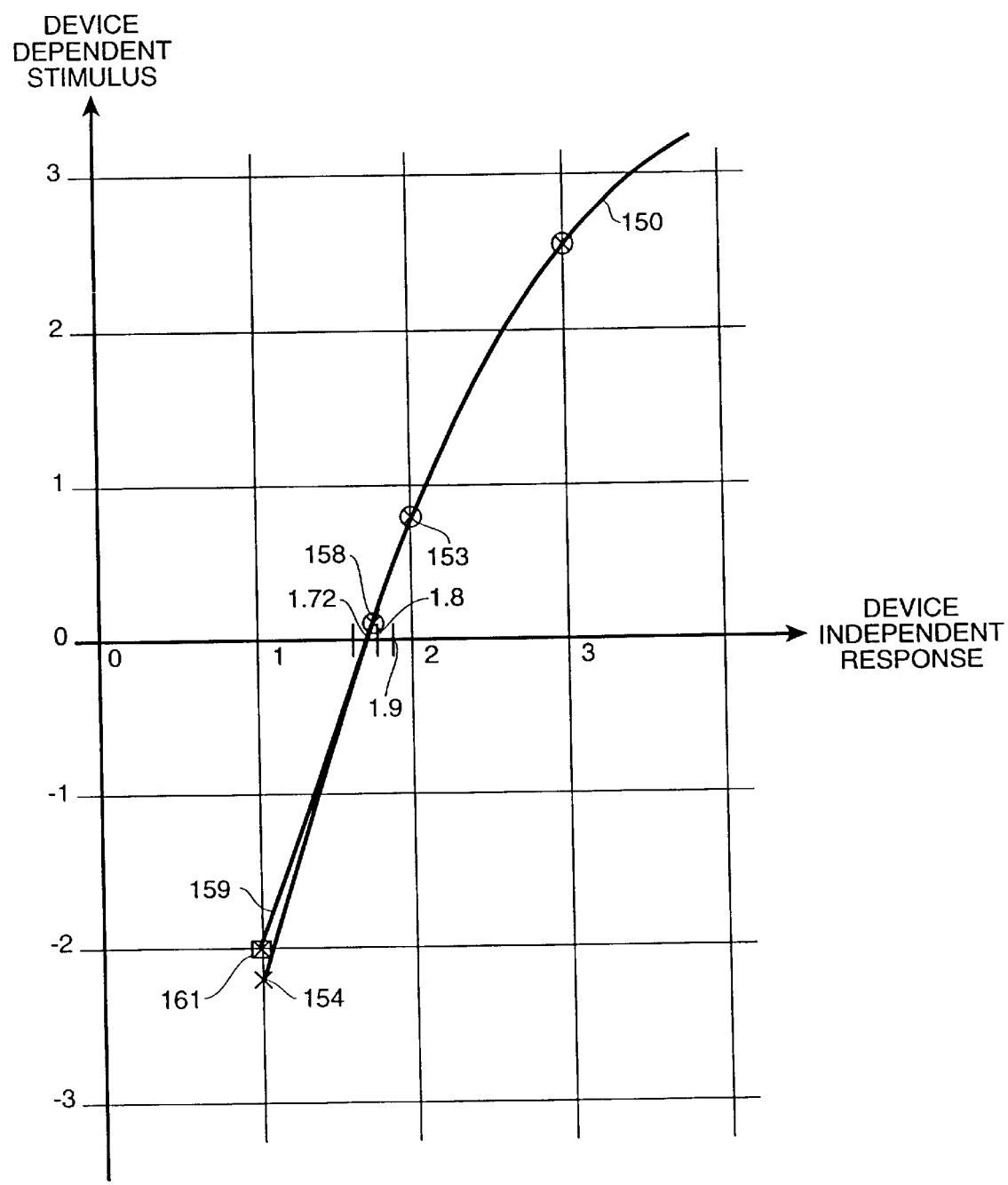

FIG. 15 illustrates the foregoing process for extrapolating a color stimulus value for an index at a color response value of 1.0. FIG. 15 includes mapping function 150 between device independent color response values and device dependent color stimulus values. Mapping function 150 corresponds to RLUT 68 in FIG. 8, extended beyond the gamut boundary at a color response value of 0 to illustrate a hypothetical best match to the actual behavior of the color device. This function maps to a color stimulus value of 0 at a color response value of 1.72, representing a gamut boundary at a color response value of 1.72.

In FIG. 15, searches and interpolations have been performed in the forward look-up table for color response values of 2.0, 1.9, 1.8 and 1.7. The search and interpolation fails for 1.7. The color stimulus values corresponding to color response values of 2.0 and 1.8 are therefore used for the linear extrapolation, resulting in an extrapolation along line 159 to point 161 with a color stimulus value of approximately −2.0. Thus, using the technique of FIG. 14, the extrapolated color stimulus value for the index at a color response value of 1.0 in portion B of RLUT 68 is −2.0.

This extrapolated color stimulus value is very close to the corresponding color stimulus value shown in FIG. 8. In addition, extrapolation line 159 closely matches mapping function 150, showing that the extrapolated color value provides a good approximation of the behavior of the color device. Thus, when this extrapolated color stimulus value in RLUT 68 is used to interpolate for a color response value at 1.72, a color stimulus of close to 0 results.

The technique of FIG. 14 can be improved by utilizing a binary search instead of searching at predetermined increments between the index in porion B and the adjacent index in portion A. This improved search is illustrated in FIGS. 16 and 17.

Figure 16:
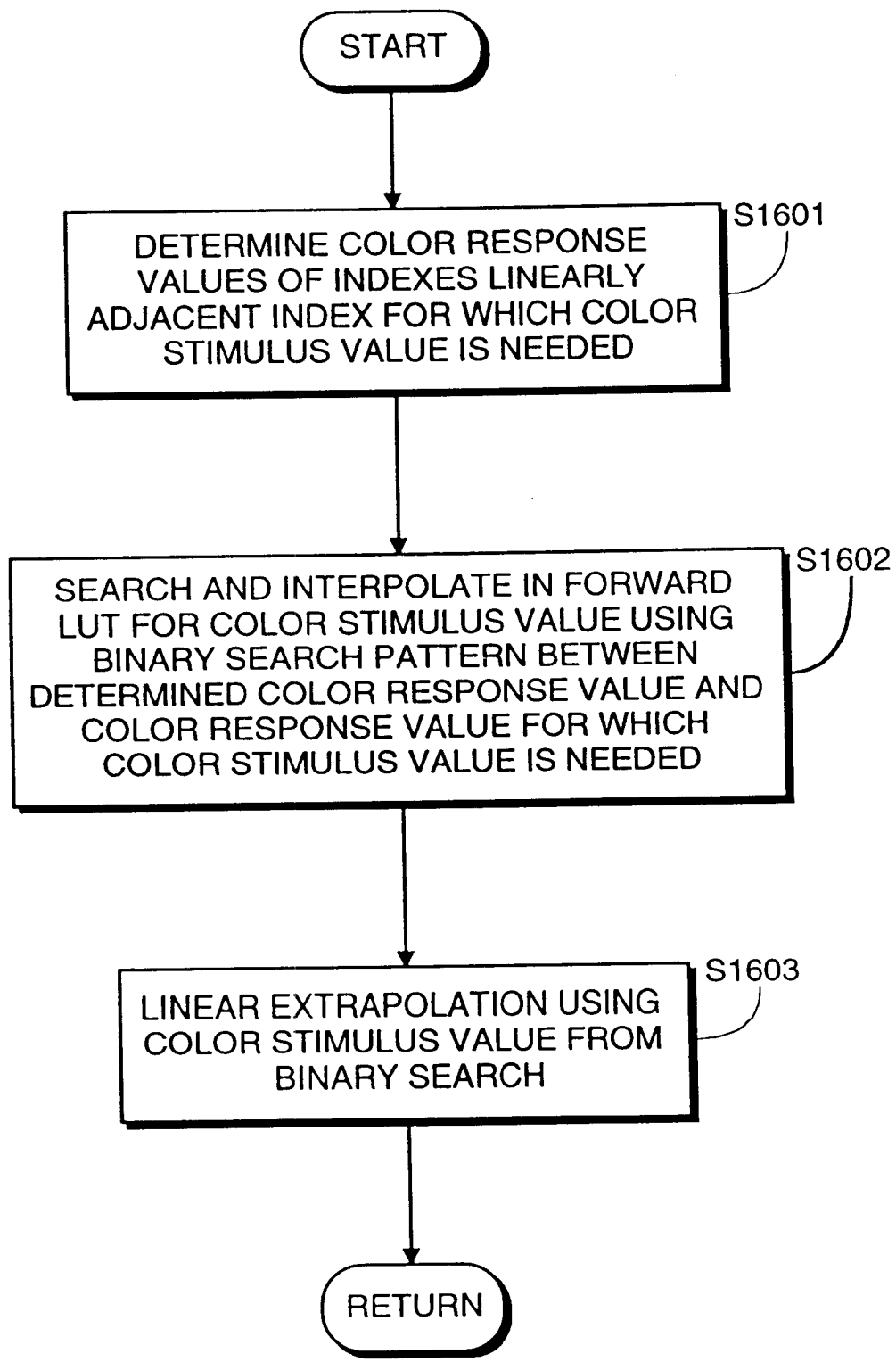
Figure 17:
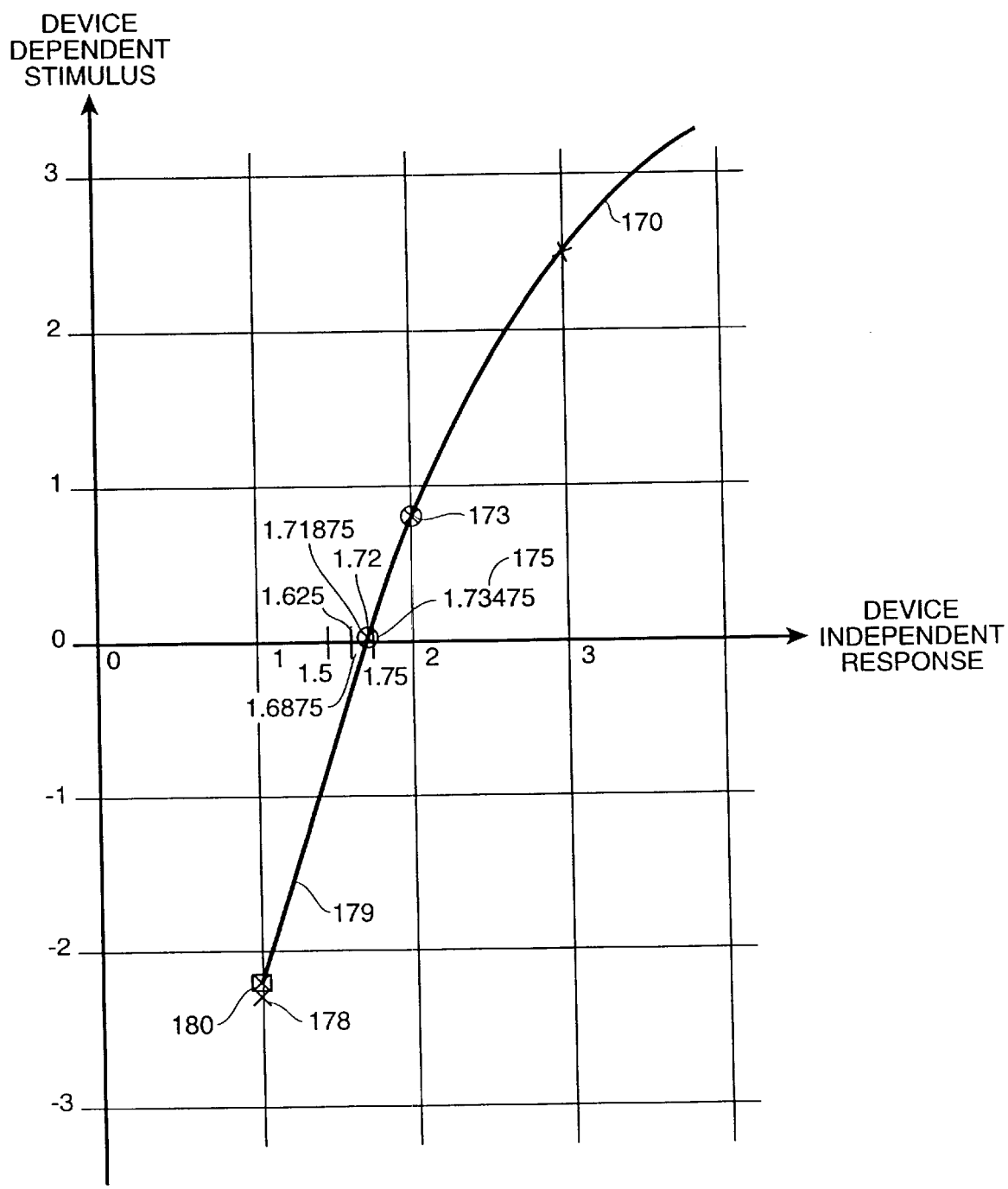

FIG. 16 is a flowchart for explaining determination of extrapolation color stimulus values using a binary search of color response values between the index in portion B and an adjacent index in portion A. In more detail, step S1601 determines a color response value of an index which is adjacent to the index in portion B. For example, in FIG. 8, the index with a color response value of 2.0 in portion A is adjacent to the index at color response value of 1.0 in portion B. Likewise, in the multidimensional case illustrated in FIG. 10, indexes at vertices 85 through and 91 in portion A are considered to be adjacent to the index at vertex 92 in portion B.

In step S1602, a binary search is made of a search segment between the color response value of the index in portion B and color response value of the adjacent index in portion A. In particular, a point in the middle of the search segment is selected. If search and interpolation in the forward look-up table succeeds for the color response value of the point, a new search segment is defined as the segment between that point and the out-of-gamut color response value of the index in portion B of the table. Otherwise, a new search segment is defined as the segment between that point and the in-gamut color response value of the index in portion A of the table. Once the size of the search segment reaches a predetermined threshold, then the search stops.

In step S1603, linear extrapolation is performed for the index in portion B. One extrapolation color stimulus values preferably is the color stimulus value found for the adjacent index in portion A of the table. The other extrapolation color stimulus value preferably is the color stimulus value found for the last successful search and interpolation in the binary search. Alternatively, the last two successfully searched values may be utilized.

FIG. 17 illustrates the foregoing process for extrapolating a color stimulus value for an index at a color response value of 1.0. FIG. 17 includes mapping function 170 between device independent color response values and device dependent color stimulus values. Mapping function 170 corresponds to RLUT 68 in FIG. 8, extended beyond the gamut boundary at a color response value of 0 to illustrate a hypothetical best match to the actual behavior of the color device. This function maps to a color stimulus value of 0 at a color response value of 1.72, representing a gamut boundary at a color response value of 1.72.

In FIG. 17, searches and interpolations have been performed in the forward look-up table for color response values of 1.5 (fails), 1.75 (succeeds), 1.625 (fails), 1.6875 (fails), 1.71875 (fails), and 1.734375 (succeeds), at which point the threshold for the remaining segment size is reached and the search is halted. Linear extrapolation from point 173 at a color response value of 2.0 and point 175 at a color response value of 1.734375 is along line 179 to point 180. Point 180 has a color stimulus value very close to −2.2, which very closely matches the hypothetical best solution.

Another technique for performing the search and interpolation is to utilize a derivative-based (or slope-based) extrapolation. This technique leads to an even more accurate result. According to this technique, a slope of the color stimulus values near the gamut boundary is determined from the reverse look-up table. In particular, the slope at the last series of points (e.g., points with color response values closest to the gamut boundary) are so determined. Extrapolation is then performed based on this slope.

Figure 18:
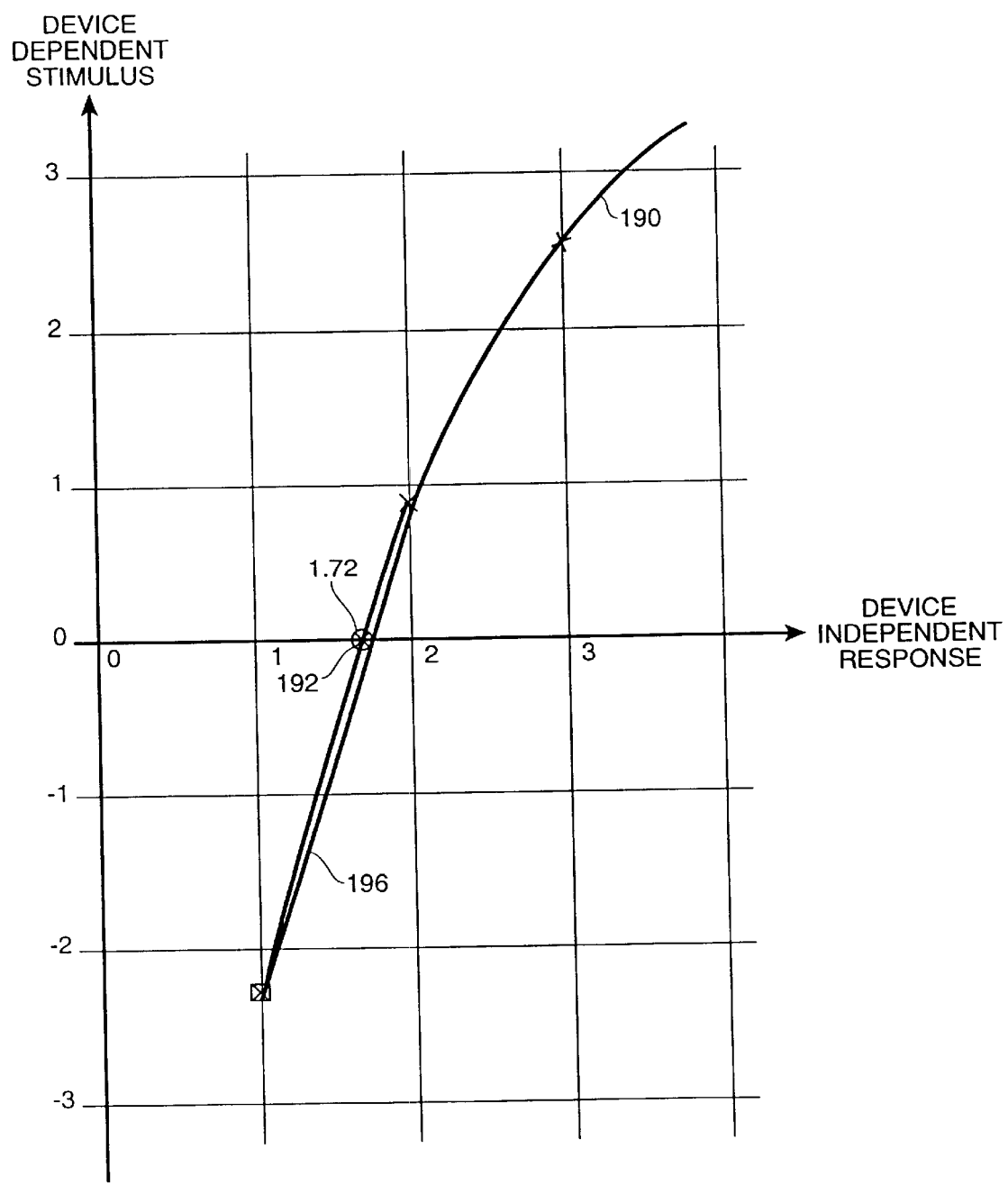

FIG. 18 graphically depicts this technique. FIG. 18 includes mapping function 190 between device independent color response values and device dependent color stimulus values. Mapping function 190 corresponds to RLUT 68 in FIG. 8, extended beyond the gamut boundary at a color response value of 0 to illustrate a hypothetical best match to the actual behavior of the color device. This function maps to a color stimulus value of 0 at a color response value of 1.72, representing a gamut boundary at a color response value of 1.72.

In FIG. 18, a slope is determined at point 192, which corresponds to an end point of data in the forward look-up table. The slope at this end point is determine from data in the reverse look-up table, and extrapolation along line 196 based on this slope is performed accordingly. This method should provide the best extrapolation for indexes in portion B of the reverse look-up table.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for creating a reverse look-up table from a forward look-up table for a color device; the forward look-up table for mapping a color stimulus value in a device dependent color space to a color response value in a device independent appearance color space, indexes to the forward look-up table spanning all possible color stimulus values for the color device, and outputs from the forward look-up table spanning a color gamut of corresponding color response values for the color device; and the reverse look-up table for mapping a color response value in the device independent appearance color space to a color stimulus value in the device dependent color space, indexes to the reverse look-up table spanning beyond the color gamut of color response values for the color device, and outputs from the reverse look-up table spanning beyond all possible color stimulus values for the color device; the method comprising the steps of:

populating a first portion of the reverse look-up table, wherein indexes to the first portion comprise color response values that fall within the color gamut of the color device, and wherein the first portion is populated by search and interpolation in the forward look-up table for color stimulus values corresponding to color response values of the indexes to the first portion of the reverse look-up table; and populating a second portion of the reverse look-up table, wherein indexes to the second portion comprise color response values that fall outside of the color gamut of the color device, wherein the second portion is populated by extrapolation from extrapolation color stimulus values, and wherein the extrapolation color stimulus values are found by search and interpolation in the forward look-up table for color stimulus values corresponding to color response values near a boundary of the color gamut.

2. A method according to claim 1, wherein said search and interpolation in the forward look-up table is performed by the Newton-Raphson method.

3. A method according to claim 1, wherein it is determined whether an index to the reverse look-up table is in the first portion or the second portion by attempting to search and to interpolate in the forward look-up table for a color stimulus value corresponding to a color response value of the index, and if the search and interpolation succeeds, determining that the index is to the first portion of the reverse look-up table, and if the search and interpolation does not succeed, determining that the index is to the second portion of the reverse look-up table.

4. A method according to claim 3, wherein the second portion of the reverse look-up table is only populated for indexes which are adjacent to at least one index to the first portion of the reverse look-up table.

5. A method according to claim 1, wherein for each index to the second portion of the reverse look-up table, search and interpolation in the forward look-up table for color stimulus values corresponding to color response values near a boundary of the color gamut further comprises: (1) determining color response values of indexes to the first portion of the reverse look-up table adjacent to and in a line with the index to the second portion of the reverse look-up table, and (2) searching and interpolating in the forward look-up table for color stimulus values corresponding to the determined color response values; and wherein the extrapolation is linear extrapolation.

6. A method according to claim 1, wherein for each index to the second portion of the reverse look-up table, search and interpolation in the forward look-up table for color stimulus values corresponding to color response values near a boundary of the color gamut further comprises: (1) determining a color response value of an index to the first portion of the reverse look-up table adjacent to the index to the second portion of the reverse look-up table, and (2) attempting to search and to interpolate in the forward look-up table for color stimulus values corresponding to color response values along a search segment between the determined color response value and a color response value of the index to the second portion of the reverse look-up table until an attempt fails, with attempts starting at the determined color response value and progressing at predetermined increments toward the color response value of the index to the second portion of the reverse look-up table;

wherein the extrapolation color stimulus values are: (1) the color stimulus value corresponding to the determined color response value, and (2) the color stimulus value corresponding to a last color response value for which search and interpolation succeeded; and wherein the extrapolation is linear extrapolation.

7. A method according to claim 1, wherein for each index to the second portion of the reverse look-up table, search and interpolation in the forward look-up table for color stimulus values corresponding to color response values near a boundary of the color gamut further comprises: (1) determining a color response value of an index to the first portion of the reverse look-up table adjacent to the index to the second portion of the reverse look-up table, and (2) attempting to search and to interpolate in the forward look-up table for color stimulus values corresponding to color response values along a search segment between the determined color response value and a color response value of the index to the second portion of the reverse look-up table, with attempts made in a binary search pattern between the determined color response value and the color response value of the index to the second portion of the reverse look-up table;

wherein the extrapolation color stimulus values are: (1) the color stimulus value corresponding to the determined color response value, and (2) the color stimulus value which results from the binary search; and wherein the extrapolation is linear extrapolation.

8. A method according to claim 1, wherein the extrapolation is based on a determined slope of the color stimulus values near the color gamut boundary.

9. An apparatus for creating a reverse look-up table from a forward look-up table for a color device; the forward look-up table for mapping a color stimulus value in a device dependent color space to a color response value in a device independent appearance color space, indexes to the forward look-up table spanning all possible color stimulus values for the color device, and outputs from the forward look-up table spanning a color gamut of corresponding color response values for the color device; and the reverse look-up table for mapping a color response value in the device independent appearance color space to a color stimulus value in the device dependent color space, indexes to the reverse look-up table spanning beyond the color gamut of color response values for the color device, and outputs from the reverse look-up table spanning beyond all possible color stimulus values for the color device; the apparatus comprising:

a memory including a region for storing executable process steps; and a processor for executing the executable process steps;

wherein the executable process steps include the steps of:
(a) populating a first portion of the reverse look-up table, wherein indexes to the first portion comprise color response values that fall within the color gamut of the color device, and wherein the first portion is populated by search and interpolation in the forward look-up table for color stimulus values corresponding to color response values of the indexes to the first portion of the reverse look-up table; and (b) populating a second portion of the reverse look-up table, wherein indexes to the second portion comprise color response values that fall outside of the color gamut of the color device, wherein the second portion is populated,by extrapolation from extrapolation color stimulus values, and wherein the extrapolation color stimulus values are found by search and interpolation in the forward look-up table for color stimulus values corresponding to color response values near a boundary of the color gamut.

10. An apparatus according to claim 9, wherein said search and interpolation in the forward look-up table is performed by the Newton-Raphson method.

11. An apparatus according to claim 9, wherein it is determined whether an index to the reverse look-up table is in the first portion or the second portion by attempting to search and to interpolate in the forward look-up table for a color stimulus value corresponding to a color response value of the index, and if the search and interpolation succeeds, determining that the index is to the first portion of the reverse look-up table, and if the search and interpolation does not succeed, determining that the index is to the second portion of the reverse look-up table.

12. An apparatus according to claim 11, wherein the second portion of the reverse look-up table is only populated for indexes which are adjacent to at least one index to the first portion of the reverse look-up table.

13. An apparatus according to claim 9, wherein for each index to the second portion of the reverse look-up table, search and interpolation in the forward look-up table for color stimulus values corresponding to color response values near a boundary of the color gamut is performed by: (1) determining color response values of indexes to the first portion of the reverse look-up table adjacent to and in a line with the index to the second portion of the reverse look-up table, and (2) searching and interpolating in the forward look-up table for color stimulus values corresponding to the determined color response values; and wherein the extrapolation is linear extrapolation.

14. An apparatus according to claim 9, wherein for each index to the second portion of the reverse look-up table, search and interpolation in the forward look-up table for color stimulus values corresponding to color response values near a boundary of the color gamut is performed by: (1) determining a color response value of an index to the first portion of the reverse look-up table adjacent to the index to the second portion of the reverse look-up table, and (2) attempting to search and to interpolate in the forward look-up table for color stimulus values corresponding to color response values along a search segment between the determined color response value and a color response value of the index to the second portion of the reverse look-up table until an attempt fails, with attempts starting at the determined color response value and progressing at predetermined increments toward the color response value of the index to the second portion of the reverse look-up table;

wherein the extrapolation color stimulus values are: (1) the color stimulus value corresponding to the determined color response value, and (2) the color stimulus value corresponding to a last color response value for which search and interpolation succeeded; and wherein the extrapolation is linear extrapolation.

15. An apparatus according to claim 9, wherein for each index to the second portion of the reverse look-up table, search and interpolation in the forward look-up table for color stimulus values corresponding to color response values near a boundary of the color gamut is performed by: (1) determining a color response value of an index to the first portion of the reverse look-up table adjacent to the index to the second portion of the reverse look-up table, and (2) attempting to search and to interpolate in the forward look-up table for color stimulus values corresponding to color response values along a search segment between the determined color response value and a color response value of the index to the second portion of the reverse look-up table, with attempts made in a binary search pattern between the determined color response value and the color response value of the index to the second portion of the reverse look-up table;

wherein the extrapolation color stimulus values are: (1) the color stimulus value corresponding to the determined color response value, and (2) the color stimulus value which results from the binary search; and wherein the extrapolation is linear extrapolation.

16. An apparatus according to claim 9, wherein the extrapolation is based on a determined slope of the color stimulus values near the color gamut boundary.

17. Computer-executable process steps stored on a computer-readable medium, the computer executable process steps for creating a reverse look-up table from a forward look-up table for a color device; the forward look-up table for mapping a color stimulus value in a device dependent color space to a color response value in a device independent appearance color space, indexes to the forward look-up table spanning all possible color stimulus values for the color device, and outputs from the forward look-up table spanning a color gamut of corresponding color response values for the color device; and the reverse look-up table for mapping a color response value in the device independent appearance color space to a color stimulus value in the device dependent color space, indexes to the reverse look-up table spanning beyond the color gamut of color response values for the color device, and outputs from the reverse look-up table spanning beyond all possible color stimulus values for the color device; the computer-executable process steps comprising:

first populating code to populate a first portion of the reverse look-up table, wherein indexes to the first portion comprise color response values that fall within the color gamut of the color device, and wherein the first portion is populated by search and interpolation in the forward look-up table for color stimulus values corresponding to color response values of the indexes to the first portion of the reverse look-up table; and second populating code to populate a second portion of the reverse look-up table, wherein indexes to the second portion comprise color response values that fall outside of the color gamut of the color device, wherein the second portion is populated by extrapolation from extrapolation color stimulus values, and wherein the extrapolation color stimulus values are found by search and interpolation in the forward look-up table for color stimulus values corresponding to color response values near a boundary of the color gamut.

18. Computer-executable process steps according to claim 17, wherein said search and interpolation in the forward look-up table is performed by the Newton-Raphson method.

19. Computer-executable process steps according to claim 17, wherein it is determined whether an index to the reverse look-up table is in the first portion or the second portion by attempting to search and to interpolate in the forward look-up table for a color stimulus value corresponding to a color response value of the index, and if the search and interpolation succeeds, determining that the index is to the first portion of the reverse look-up table, and if the search and interpolation does not succeed, determining that the index is to the second portion of the reverse look-up table.

20. Computer-executable process steps according to claim 19, wherein the second portion of the reverse look-up table is only populated for indexes which are adjacent to at least one index to the first portion of the reverse look-up table.

21. Computer-executable process steps according to claim 17, wherein for each index to the second portion of the reverse look-up table, search and interpolation in the forward look-up table for color stimulus values corresponding to color response values near a boundary of the color gamut is performed by: (1) determining code to determine color response values of indexes to the first portion of the reverse look-up table adjacent to and in a line with the index to the second portion of the reverse look-up table, and (2) search and interpolation code to search and to interpolate in the forward look-up table for color stimulus values corresponding to the determined color response values; and wherein the extrapolation is linear extrapolation.

22. Computer-executable process steps according to claim 17, wherein for each index to the second portion of the reverse look-up table, search and interpolation in the forward look-up table for color stimulus values corresponding to color response values near a boundary of the color gamut is performed by: (1) determining code to determine a color response value of an index to the first portion of the reverse look-up table adjacent to the index to the second portion of the reverse look-up table, and (2) search and interpolation code to attempting to search and to interpolate in the forward look-up table for color stimulus values corresponding to color response values along a search segment between the determined color response value and a color response value of the index to the second portion of the reverse look-up table until an attempt fails, with attempts starting at the determined color response value and progressing at predetermined increments toward the color response value of the index to the second portion of the reverse look-up table;

wherein the extrapolation color stimulus values are: (1) the color stimulus value corresponding to the determined color response value, and (2) the color stimulus value corresponding to a last color response value for which search and interpolation succeeded; and wherein the extrapolation is linear extrapolation.

23. Computer-executable process steps according to claim 17, wherein for each index to the second portion of the reverse look-up table, search and interpolation in the forward look-up table for color stimulus values corresponding to color response values near a boundary of the color gamut is performed by: (1) determining code to determine a color response value of an index to the first portion of the reverse look-up table adjacent to the index to the second portion of the reverse look-up table, and (2) search and interpolation code to attempt to search and to interpolate in the forward look-up table for color stimulus values corresponding to color response values along a search segment between the determined color response value and a color response value of the index to the second portion of the reverse look-up table, with attempts made in a binary search pattern between the determined color response value and the color response value of the index to the second portion of the reverse look-up table;

wherein the extrapolation color stimulus values are: (1) the color stimulus value corresponding to the determined color response value, and (2) the color stimulus value which results from the binary search; and wherein the extrapolation is linear extrapolation.

24. Computer-executable process steps according to claim 17, wherein the extrapolation is based on a determined slope of the color stimulus values near the color gamut boundary.

25. A computer-readable medium which stores computer-executable process steps, the computer-executable process steps for creating a reverse look-up table from a forward look-up table for a color device; the forward look-up table for mapping a color stimulus value in a device dependent color space to a color response value in a device independent appearance color space, indexes to the forward look-up table spanning all possible color stimulus values for the color device, and outputs from the forward look-up table spanning a color gamut of corresponding color response values for the color device; and the reverse look-up table for mapping a color response value in the device independent appearance color space to a color stimulus value in the device dependent color space, indexes to the reverse look-up table spanning beyond the color gamut of color response values for the color device, and outputs from the reverse look-up table spanning beyond all possible color stimulus values for the color device; the computer-executable process steps comprising:

a first populating step to populate a first portion of the reverse look-up table, wherein indexes to the first portion comprise color response values that fall within the color gamut of the color device, and wherein the first portion is populated by search and interpolation in the forward look-up table for color stimulus values corresponding to color response values of the indexes to the first portion of the reverse look-up table; and a second populating step to populate a second portion of the reverse look-up table, wherein indexes to the second portion comprise color response values that fall outside of the color gamut of the color device, wherein the second portion is populated by extrapolation from extrapolation color stimulus values, and wherein the extrapolation color stimulus values are found by search and interpolation in the forward look-up table for color stimulus values corresponding to color response values near a boundary of the color gamut.

26. A computer-readable medium according to claim 25, wherein said search and interpolation in the forward look-up table is performed by the Newton-Raphson method.

27. A computer-readable medium according to claim 25, wherein it is determined whether an index to the reverse look-up table is in the first portion or the second portion by attempting to search and to interpolate in the forward look-up table for a color stimulus value corresponding to a color response value of the index, and if the search and interpolation succeeds, determining that the index is to the first portion of the reverse look-up table, and if the search and interpolation does not succeed, determining that the index is to the second portion of the reverse look-up table.

28. A computer-readable medium according to claim 27, wherein the second portion of the reverse look-up table is only populated for indexes which are adjacent to at least one index to the first portion of the reverse look-up table.

29. A computer-readable medium according to claim 25, wherein for each index to the second portion of the reverse look-up table, search and interpolation in the forward look-up table for color stimulus values corresponding to color response values near a boundary of the color gamut is performed by: (1) a determining step to determine color response values of indexes to the first portion of the reverse look-up table adjacent to and in a line with the index to the second portion of the reverse look-up table, and (2) a searching and interpolating step to search and to interpolate in the forward look-up table for color stimulus values corresponding to the determined color response values; and wherein the extrapolation is linear extrapolation.

30. A computer-readable medium according to claim 25, wherein for each index to the second portion of the reverse look-up table, search and interpolation in the forward look-up table for color stimulus values corresponding to color response values near a boundary of the color gamut is performed by: (1) a determining step to determine a color response value of an index to the first portion of the reverse look-up table adjacent to the index to the second portion of the reverse look-up table, and (2) a searching and interpolating step to attempt to search and to interpolate in the forward look-up table for color stimulus values corresponding to color response values along a search segment between the determined color response value and a color response value of the index to the second portion of the reverse look-up table until an attempt fails, with attempts starting at the determined color response value and progressing at predetermined increments toward the color response value of the index to the second portion of the reverse look-up table;

wherein the extrapolation color stimulus values are: (1) the color stimulus value corresponding to the determined color response value, and (2) the color stimulus value corresponding to a last color response value for which search and interpolation succeeded; and wherein the extrapolation is linear extrapolation.

31. A computer-readable medium according to claim 25, wherein for each index to the second portion of the reverse look-up table, search and interpolation in the forward look-up table for color stimulus values corresponding to color response values near a boundary of the color gamut is performed by: (1) a determining step to determine a color response value of an index to the first portion of the reverse look-up table adjacent to the index to the second portion of the reverse look-up table, and (2) a searching and interpolating step to attempt to search and to interpolate in the forward look-up table for color stimulus values corresponding to color response values along a search segment between the determined color response value and a color response value of the index to the second portion of the reverse look-up table, with attempts made in a binary search pattern between the determined color response value and the color response value of the index to the second portion of the reverse look-up table;

wherein the extrapolation color stimulus values are: (1) the color stimulus value corresponding to the determined color response value, and (2) the color stimulus value which results from the binary search; and wherein the extrapolation is linear extrapolation.

32. A computer-readable medium according to claim 25, wherein the extrapolation is based on a determined slope of the color stimulus values near the color gamut boundary.

33. An apparatus for creating a reverse look-up table from a forward look-up table for a color device; the forward look-up table for mapping a color stimulus value in a device dependent color space to a color response value in a device independent appearance color space, indexes to the forward look-up table spanning all possible color stimulus values for the color device, and outputs from the forward look-up table spanning a color gamut of corresponding color response values for the color device; and the reverse look-up table for mapping a color response value in the device independent appearance color space to a color stimulus value in the device dependent color space, indexes to the reverse look-up table spanning beyond the color gamut of color response values for the color device, and outputs from the reverse look-up table spanning beyond all possible color stimulus values for the color device; the apparatus comprising:

first populating means to populate a first portion of the reverse look-up table, wherein indexes to the first portion comprise color response values that fall within the color gamut of the color device, and wherein the first portion is populated by search and interpolation in the forward look-up table for color stimulus values corresponding to color response values of the indexes to the first portion of the reverse look-up table; and second populating means to populate a second portion of the reverse look-up table, wherein indexes to the second portion comprise color response values that fall outside of the color gamut of the color device, wherein the second portion is populated by extrapolation from extrapolation color stimulus values, and wherein the extrapolation color stimulus values are found by search and interpolation in the forward look-up table for color stimulus values corresponding to color response values near a boundary of the color gamut.

34. An apparatus according to claim 33, wherein said search and interpolation in the forward look-up table is performed by the Newton-Raphson method.

35. An apparatus according to claim 33, wherein it is determined whether an index to the reverse look-up table is in the first portion or the second portion by attempting to search and to interpolate in the forward look-up table for a color stimulus value corresponding to a color response value of the index, and if the search and interpolation succeeds, determining that the index is to the first portion of the reverse look-up table, and if the search and interpolation does not succeed, determining that the index is to the second portion of the reverse look-up table.

36. An apparatus according to claim 35, wherein the second portion of the reverse look-up table is only populated for indexes which are adjacent to at least one index to the first portion of the reverse look-up table.

37. An apparatus according to claim 33, wherein for each index to the second portion of the reverse look-up table, search and interpolation in the forward look-up table for color stimulus values corresponding to color response values near a boundary of the color gamut is performed by: (1) determining means for determining color response values of indexes to the first portion of the reverse look-up table adjacent to and in a line with the index to the second portion of the reverse look-up table, and (2) searching and interpolating means for searching and interpolating in the forward look-up table for color stimulus values corresponding to the determined color response values; and wherein the extrapolation is linear extrapolation.

38. An apparatus according to claim 33, wherein for each index to the second portion of the reverse look-up table, search and interpolation in the forward look-up table for color stimulus values corresponding to color response values near a boundary of the color gamut is performed by: (1) determining means for determining a color response value of an index to the first portion of the reverse look-up table adjacent to the index to the second portion of the reverse look-up table, and (2) searching and interpolating means for attempting to search and to interpolate in the forward look-up table for color stimulus values corresponding to color response values along a search segment between the determined color response value and a color response value of the index to the second portion of the reverse look-up table until an attempt fails, with attempts starting at the determined color response value and progressing at predetermined increments toward the color response value of the index to the second portion of the reverse look-up table;

wherein the extrapolation color stimulus values are: (1) the color stimulus value corresponding to the determined color response value, and (2) the color stimulus value corresponding to a last color response value for which search and interpolation succeeded; and wherein the extrapolation is linear extrapolation.

39. An apparatus according to claim 33, wherein for each index to the second portion of the reverse look-up table, search and interpolation in the forward look-up table for color stimulus values corresponding to color response values near a boundary of the color gamut is performed by: (1) determining means for determining a color response value of an index to the first portion of the reverse look-up table adjacent to the index to the second portion of the reverse look-up table, and (2) searching and interpolating means for attempting to search and to interpolate in the forward look-up table for color stimulus values corresponding to color response values along a search segment between the determined color response value and a color response value of the index to the second portion of the reverse look-up table, with attempts made in a binary search pattern between the determined color response value and the color response value of the index to the second portion of the reverse look-up table;

wherein the extrapolation color stimulus values are: (1) the color stimulus value corresponding to the determined color response value, and (2) the color stimulus value which results from the binary search; and wherein the extrapolation is linear extrapolation.

40. An apparatus according to claim 33, wherein the extrapolation is based on a determined slope of the color stimulus values near the color gamut boundary.

41. A method for creating a reverse look-up table for a color device using a forward look-up table that maps a color stimulus value in a device dependent color space to a color response value in a device independent appearance color space, the method comprising:

creating the reverse look-up table, wherein the reverse look-up table maps the color response value in the device independent appearance color space to a color stimulus value in the device dependent color space, and wherein indexes to a portion of the reverse look-up table span beyond the color gamut of color response values for the color device, and outputs from the portion of the reverse look-up table span beyond all possible color stimulus values for the color device.

42. The method of claim 41, wherein another portion of the reverse look-up table is populated with color response values in the device independent color appearance space that fall within the color gamut of the color device.

43. The method of claim 41 wherein said portion of the reverse look-up table is created by extrapolating from extrapolation color stimulus values, wherein the extrapolation color stimulus values are found by search and interpolation in the forward look-up table for color stimulus values corresponding to color response values near a boundary of the color gamut.

44. The method of claim 42 wherein said another portion of the reverse look-up table is created by search and interpolation in the forward look-up table for color stimulus values corresponding to color response values in the second portion of the reverse look-up table.

45. A method for creating a reverse look-up table from a forward look-up table for a color device, the forward look-up table for mapping a color value in a device dependent color space to a color value in a device independent appearance color space, and the reverse look-up table for mapping a color value in the device independent appearance space to a color value in the device dependent color space;

populating a first portion of the reverse look-up table, wherein indexes to the first portion comprise color value that fall within the color gamut of the color device, and wherein said color value in the device dependent color space of the first portion is calculated by search in the forward look-up table and interpolation of the searched color value; and populating a second portion of the reverse look-up table, wherein indexes to the second portion comprise color values that fall outside of the color gamut of the color device, and wherein said color value in the device dependent color space of the second portion is calculated by search near a boundary of the color gamut in the forward look-up table and extrapolation of the searched color value.

46. Computer-executable program code stored on a computer readable medium, said computer-executable program code for creating a reverse look-up table from a forward look-up table for a color device, the forward look-up table for mapping a color value in a device dependent color space to a color value in a device independent appearance color space, and the reverse look-up table for mapping a color value in the device independent appearance space to a color value in the device dependent color space, said computer-executable program code comprising:

code to populate a first portion of the reverse look-up table, wherein indexes to the first portion comprise color values that fall within the color gamut of the color device, and wherein said color value in the device dependent color space of the first portion is calculated by search in the forward look-up table and interpolation of the searched color value; and code to populate a second portion of the reverse look-up table, wherein indexes to the second portion comprise color values that fall outside of the color gamut of the color device, and wherein said color value in the device dependent color space of the second portion is calculated by search near a boundary of the color gamut in the forward look-up table and extrapolation of the searched color value.

* * * * *

UNITED STATES PATENT AND TRADEMARK OFFICE
CERTIFICATE OF CORRECTION

PATENT NO. : 6,919,975 B1
DATED : July 19, 2005
INVENTOR(S) : John S. Haikin et al.

It is certified that error appears in the above-identified patent and that said Letters Patent is hereby corrected as shown below:

Column 13,
Line 31, "porion" should read -- portion --.

Column 14,
Line 43, "determine" should read -- determined --.

Column 16,
Line 65, "populated,by" should read -- populated by --.

Column 19,
Line 23, "attempting" should read -- attempt --.

Column 24,
Line 15, "value" should read -- values --.

Signed and Sealed this

Fourteenth Day of February, 2006

JON W. DUDAS
*Director of the United States Patent and Trademark Office*